US008774082B2

(12) United States Patent
Roberts et al.

(10) Patent No.: US 8,774,082 B2
(45) **Date of Patent: *Jul. 8, 2014**

(54) ETHERNET DIGITAL STORAGE (EDS) CARD AND SATELLITE TRANSMISSION SYSTEM

(75) Inventors: Roswell Roberts, San Diego, CA (US); Ian Lerner, La Jolla, CA (US); Lowell E. Teschmacher, Carlsbad, CA (US)

(73) Assignee: Megawave Audio LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,628

(22) Filed: Sep. 11, 2012

(65) Prior Publication Data

US 2013/0065509 A1 Mar. 14, 2013

Related U.S. Application Data

(63) Continuation of application No. 11/624,636, filed on Jan. 18, 2007, now Pat. No. 8,284,774, which is a continuation of application No. 09/425,118, filed on Oct. 22, 1999, now abandoned, and a continuation-in-part of application No. 09/287,200, filed on Apr. 3, 1999, now Pat. No. 6,160,797.

(60) Provisional application No. 60/105,468, filed on Oct. 23, 1998, provisional application No. 60/080,530, filed on Apr. 3, 1998, provisional application No. 60/105,878, filed on Oct. 27, 1998.

(51) Int. Cl.
*H04B 7/185* (2006.01)
*H04L 12/28* (2006.01)

(52) U.S. Cl.
USPC ............ 370/316; 370/392; 370/419; 370/463

(58) Field of Classification Search
USPC ................................ 370/316, 392, 419, 463
See application file for complete search history.

(56) References Cited

U.S. PATENT DOCUMENTS 3,594,495 A 7/1971 Bond
3,626,295 A 12/1971 Sabrui
(Continued)

FOREIGN PATENT DOCUMENTS

AU 744624 2/2002
CA 2199360 6/2001
(Continued)

OTHER PUBLICATIONS

Arora et al., "Asymmetric Internet Access over Satellite-Terrestrial Networks," Center for Satellite and Hybrid Communication Networks, 1995, 1-7.

(Continued)

*Primary Examiner* — Andrew Lee
(74) *Attorney, Agent, or Firm* — Baker & Hostetler LLP

(57) ABSTRACT

An Ethernet Digital Storage (EDS) Card and satellite transmission system is provided for receiving, storing, and transmitting files. A data stream is received and may be stored at the receiver or routed as TCP/IP packets. The EDS Card includes an HTTP server. A DHCP on the EDS card provides dynamic configuration of the card's IP address. The EDS card includes a PPP and modem processor. The EDS card includes an event scheduler. A command processor keeps a built-in log of audio spots played. Files may be transmitted from the EDS card via an M&C port, an Ethernet port, or an auxiliary RS-232 port. Files may be received from a data stream from a satellite, an M&C port, an Ethernet port, or an auxiliary RS-232 port. The EDS card also provides time shifting and may be used without a satellite feed as an HTTP-controlled router with storage.

40 Claims, 13 Drawing Sheets

(56) References Cited

U.S. PATENT DOCUMENTS

| | | | |
|---|---|---|---|
| 3,898,376 | A | 8/1975 | Nabeyama et al. |
| 4,130,730 | A | 12/1978 | Ostrowski |
| D264,691 | S | 6/1982 | Volkland et al. |
| 4,346,262 | A | 8/1982 | Willems et al. |
| D267,249 | S | 12/1982 | Fukushima et al. |
| 4,494,238 | A | 1/1985 | Groth, Jr. |
| D277,569 | S | 2/1985 | Georgopulos |
| 4,544,950 | A | 10/1985 | Tu |
| D281,974 | S | 12/1985 | Suzuki et al. |
| RE32,124 | E | 4/1986 | Atal |
| 4,624,012 | A | 11/1986 | Lin et al. |
| 4,641,343 | A | 2/1987 | Holland et al. |
| D289,616 | S | 5/1987 | Imazeki |
| D291,443 | S | 8/1987 | Pedinielli et al. |
| 4,720,873 | A | 1/1988 | Goodman et al. |
| 4,725,886 | A | 2/1988 | Galumbeck et al. |
| 4,731,783 | A | 3/1988 | Fontanes |
| 4,763,321 | A | 8/1988 | Calvignac et al. |
| 4,821,260 | A | 4/1989 | Klank et al. |
| 4,831,624 | A | 5/1989 | McLaughlin et al. |
| 4,907,277 | A | 3/1990 | Callens et al. |
| 4,916,539 | A | 4/1990 | Galumbeck et al. |
| 4,972,484 | A | 11/1990 | Theile et al. |
| 5,111,292 | A | 5/1992 | Kuriacose et al. |
| 5,132,992 | A | 7/1992 | Yurt et al. |
| 5,144,431 | A | 9/1992 | Citta et al. |
| 5,151,998 | A | 9/1992 | Capps |
| 5,161,210 | A | 11/1992 | Druyvesteyn et al. |
| 5,214,708 | A | 5/1993 | McEachern |
| 5,239,540 | A | 8/1993 | Rovira et al. |
| 5,253,275 | A | 10/1993 | Yurt et al. |
| 5,282,028 | A | 1/1994 | Johnson et al. |
| 5,282,202 | A | 1/1994 | Bernstein et al. |
| 5,287,351 | A | 2/1994 | Wall, Jr. et al. |
| 5,301,363 | A | 4/1994 | Hinderks |
| 5,305,440 | A | 4/1994 | Morgan et al. |
| 5,319,707 | A | 6/1994 | Wasilewski et al. |
| 5,325,423 | A | 6/1994 | Lewis |
| 5,333,155 | A | 7/1994 | Dambacher |
| D349,503 | S | 8/1994 | Roy |
| 5,341,457 | A | 8/1994 | Hall, II et al. |
| 5,343,305 | A | 8/1994 | Shiraogawa et al. |
| D350,544 | S | 9/1994 | Sakuta et al. |
| 5,349,699 | A | 9/1994 | Erben et al. |
| 5,375,068 | A | 12/1994 | Palmer et al. |
| 5,381,412 | A | 1/1995 | Otani |
| 5,388,182 | A | 2/1995 | Benedetto et al. |
| 5,389,965 | A | 2/1995 | Kuzma |
| 5,392,066 | A | 2/1995 | Fisher et al. |
| 5,392,353 | A | 2/1995 | Morales |
| 5,394,561 | A | 2/1995 | Freeburg |
| 5,396,497 | A | 3/1995 | Veltman |
| 5,403,639 | A | 4/1995 | Belsan et al. |
| 5,404,567 | A | 4/1995 | DePietro et al. |
| 5,406,558 | A | 4/1995 | Rovira et al. |
| 5,414,773 | A | 5/1995 | Handelman |
| 5,432,907 | A | 7/1995 | Picazo, Jr. et al. |
| 5,440,336 | A | 8/1995 | Buhro et al. |
| 5,450,134 | A | 9/1995 | Legate |
| 5,455,570 | A | 10/1995 | Cook et al. |
| 5,461,619 | A | 10/1995 | Citta et al. |
| 5,463,424 | A | 10/1995 | Dressler |
| 5,479,447 | A | 12/1995 | Chow et al. |
| 5,490,136 | A | 2/1996 | Sereno et al. |
| 5,490,233 | A | 2/1996 | Kovacevic |
| 5,493,339 | A | 2/1996 | Birch et al. |
| 5,493,647 | A | 2/1996 | Miyasaka et al. |
| 5,495,554 | A | 2/1996 | Edwards et al. |
| 5,508,949 | A | 4/1996 | Konstantinides |
| 5,515,107 | A | 5/1996 | Chiang et al. |
| 5,528,725 | A | 6/1996 | Hui |
| 5,530,655 | A | 6/1996 | Lokhoff et al. |
| 5,530,842 | A | 6/1996 | Abraham et al. |
| 5,534,913 | A | 7/1996 | Majeti et al. |
| 5,535,300 | A | 7/1996 | Hall, II et al. |
| 5,550,863 | A | 8/1996 | Yurt et al. |
| D373,767 | S | 9/1996 | Hinderks |
| 5,557,334 | A | 9/1996 | Legate |
| 5,557,724 | A | 9/1996 | Sampat et al. |
| 5,559,549 | A | 9/1996 | Hendricks et al. |
| 5,566,209 | A | 10/1996 | Forssen et al. |
| 5,581,653 | A | 12/1996 | Todd |
| 5,583,962 | A | 12/1996 | Davis et al. |
| 5,586,121 | A | 12/1996 | Moura et al. |
| 5,587,810 | A | 12/1996 | Feldman |
| 5,588,024 | A | 12/1996 | Takano |
| 5,590,108 | A | 12/1996 | Mitsuno et al. |
| 5,594,490 | A | 1/1997 | Dawson et al. |
| 5,606,668 | A | 2/1997 | Shwed |
| 5,608,446 | A | 3/1997 | Carr et al. |
| 5,615,211 | A | 3/1997 | Santore et al. |
| 5,633,981 | A | 5/1997 | Davis |
| 5,659,615 | A | 8/1997 | Dillon |
| 5,659,877 | A | 8/1997 | Enomoto et al. |
| 5,675,575 | A | 10/1997 | Wall, Jr. et al. |
| 5,694,334 | A | 12/1997 | Donahue et al. |
| 5,694,490 | A | 12/1997 | Howell et al. |
| 5,694,546 | A | 12/1997 | Reisman |
| 5,699,411 | A | 12/1997 | Becker et al. |
| 5,706,335 | A | 1/1998 | Hinderks |
| 5,713,075 | A | 1/1998 | Threadgill et al. |
| 5,727,002 | A | 3/1998 | Miller et al. |
| 5,732,078 | A | 3/1998 | Arango |
| 5,732,216 | A | 3/1998 | Logan et al. |
| 5,737,739 | A | 4/1998 | Shirley et al. |
| 5,751,356 | A | 5/1998 | Suzuki et al. |
| 5,757,916 | A | 5/1998 | MacDoran et al. |
| 5,778,187 | A | 7/1998 | Monteiro et al. |
| 5,778,372 | A | 7/1998 | Cordell et al. |
| 5,781,909 | A | 7/1998 | Logan et al. |
| 5,809,145 | A | 9/1998 | Slik et al. |
| 5,815,667 | A | 9/1998 | Chien et al. |
| 5,818,441 | A | 10/1998 | Throckmorton et al. |
| 5,818,512 | A | 10/1998 | Fuller |
| 5,818,830 | A | 10/1998 | Daane et al. |
| 5,818,845 | A | 10/1998 | Moura et al. |
| 5,828,655 | A | 10/1998 | Moura et al. |
| 5,828,839 | A | 10/1998 | Moncreiff |
| 5,835,726 | A | 11/1998 | Shwed et al. |
| 5,838,906 | A | 11/1998 | Doyle et al. |
| 5,841,979 | A | 11/1998 | Schulhof et al. |
| 5,842,125 | A | 11/1998 | Modzelesky |
| 5,848,386 | A | 12/1998 | Motoyama |
| 5,852,721 | A | 12/1998 | Dillon et al. |
| 5,862,325 | A | 1/1999 | Reed et al. |
| 5,881,131 | A | 3/1999 | Farris et al. |
| 5,893,091 | A | 4/1999 | Hunt et al. |
| 5,894,554 | A | 4/1999 | Lowery et al. |
| 5,915,207 | A | 6/1999 | Dao et al. |
| 5,930,515 | A | 7/1999 | Ducharme et al. |
| 5,930,708 | A | 7/1999 | Stewart et al. |
| 5,956,483 | A | 9/1999 | Grate et al. |
| 5,968,129 | A | 10/1999 | Dillon et al. |
| 5,987,480 | A | 11/1999 | Donohue et al. |
| 5,991,292 | A | 11/1999 | Focsaneanu |
| 5,991,306 | A | 11/1999 | Burns et al. |
| 5,991,596 | A | 11/1999 | Cunningham et al. |
| 5,995,725 | A | 11/1999 | Dillon |
| 5,995,726 | A | 11/1999 | Dillon |
| 6,002,720 | A | 12/1999 | Yurt et al. |
| 6,006,173 | A | 12/1999 | Wiese et al. |
| 6,011,548 | A | 1/2000 | Thacker |
| 6,016,388 | A | 1/2000 | Dillon |
| 6,018,764 | A | 1/2000 | Field et al. |
| 6,021,307 | A | 2/2000 | Chan |
| 6,023,345 | A | 2/2000 | Bloomfield |
| 6,031,574 | A | 2/2000 | Muller |
| 6,034,689 | A | 3/2000 | White et al. |
| 6,038,594 | A | 3/2000 | Puente et al. |
| 6,041,295 | A | 3/2000 | Hinderks |
| 6,041,359 | A | 3/2000 | Birdwell |
| 6,049,539 | A | 4/2000 | Lee et al. |
| 6,049,551 | A | 4/2000 | Hinderks et al. |
| 6,055,244 | A | 4/2000 | Wall, Jr. et al. |

(56) References Cited

U.S. PATENT DOCUMENTS

| | | | |
|---|---|---|---|
| 6,061,742 | A | 5/2000 | Stewart et al. |
| 6,078,580 | A | 6/2000 | Mandalia et al. |
| 6,078,961 | A | 6/2000 | Mourad et al. |
| 6,085,235 | A | 7/2000 | Clarke et al. |
| 6,091,707 | A | 7/2000 | Egbert et al. |
| 6,094,427 | A | 7/2000 | Yi |
| 6,094,671 | A | 7/2000 | Chase et al. |
| 6,101,180 | A | 8/2000 | Donahue et al. |
| 6,115,750 | A | 9/2000 | Dillon et al. |
| 6,124,878 | A | 9/2000 | Adams et al. |
| 6,128,374 | A | 10/2000 | Hinderks |
| 6,128,469 | A | 10/2000 | Zenick et al. |
| 6,144,702 | A | 11/2000 | Yurt et al. |
| 6,160,797 | A | 12/2000 | Robert, III et al. |
| 6,161,141 | A | 12/2000 | Dillon |
| 6,172,972 | B1 | 1/2001 | Birdwell et al. |
| 6,188,689 | B1 | 2/2001 | Katsube et al. |
| 6,201,536 | B1 | 3/2001 | Hendricks et al. |
| 6,201,797 | B1 | 3/2001 | Leuca et al. |
| 6,205,473 | B1 | 3/2001 | Thomasson et al. |
| 6,212,201 | B1 | 4/2001 | Hinderks et al. |
| 6,226,267 | B1 | 5/2001 | Spinney et al. |
| 6,262,982 | B1 | 7/2001 | Donahue et al. |
| 6,266,339 | B1 | 7/2001 | Donahue et al. |
| 6,272,338 | B1 | 8/2001 | Modzelesky et al. |
| 6,272,341 | B1 | 8/2001 | Threadgill et al. |
| 6,289,377 | B1 | 9/2001 | Lalwaney et al. |
| 6,301,463 | B1 | 10/2001 | Dao et al. |
| 6,308,328 | B1 | 10/2001 | Bowcutt et al. |
| 6,310,893 | B1 | 10/2001 | Yuan et al. |
| 6,321,268 | B1 | 11/2001 | Dillon et al. |
| 6,338,131 | B1 | 1/2002 | Dillon |
| 6,351,727 | B1 | 2/2002 | Wiese et al. |
| 6,351,728 | B1 | 2/2002 | Wiese et al. |
| 6,359,882 | B1 | 3/2002 | Robles et al. |
| 6,360,172 | B1 | 3/2002 | Burfeind et al. |
| 6,366,776 | B1 | 4/2002 | Wright et al. |
| 6,373,837 | B1 | 4/2002 | Kleyman et al. |
| 6,373,927 | B1 | 4/2002 | Hinderks |
| 6,377,981 | B1 | 4/2002 | Ollikainen et al. |
| 6,385,647 | B1 | 5/2002 | Willis et al. |
| 6,389,453 | B1 | 5/2002 | Willis |
| 6,411,607 | B1 | 6/2002 | Robert, III et al. |
| 6,411,616 | B1 | 6/2002 | Donahue et al. |
| 6,411,689 | B1 | 6/2002 | Shi et al. |
| 6,411,806 | B1 | 6/2002 | Garner et al. |
| 6,415,329 | B1 | 7/2002 | Gelman et al. |
| 6,430,233 | B1 | 8/2002 | Dillon et al. |
| 6,434,562 | B1 | 8/2002 | Pennywitt et al. |
| 6,441,782 | B2 | 8/2002 | Kelly et al. |
| 6,445,777 | B1 | 9/2002 | Clark |
| 6,466,569 | B1 | 10/2002 | Wright et al. |
| 6,473,411 | B1 | 10/2002 | Kumaki et al. |
| 6,473,793 | B1 | 10/2002 | Dillon et al. |
| 6,490,551 | B2 | 12/2002 | Wiese et al. |
| 6,498,937 | B1 | 12/2002 | Smith |
| 6,501,423 | B2 | 12/2002 | Kelly et al. |
| 6,512,749 | B1 | 1/2003 | Wright et al. |
| 6,519,651 | B1 | 2/2003 | Dillon |
| 6,522,638 | B1 | 2/2003 | Haugli et al. |
| 6,526,580 | B2 | 2/2003 | Shimomura et al. |
| 6,529,477 | B1 | 3/2003 | Toporek et al. |
| 6,529,731 | B2 | 3/2003 | Modzelesky et al. |
| 6,546,488 | B2 | 4/2003 | Dillon et al. |
| 6,560,221 | B1 | 5/2003 | Hara et al. |
| 6,571,296 | B1 | 5/2003 | Dillon |
| 6,584,082 | B1 | 6/2003 | Willis et al. |
| 6,584,083 | B1 | 6/2003 | Toporek et al. |
| 6,604,146 | B1 | 8/2003 | Rempe et al. |
| 6,611,902 | B2 | 8/2003 | Kuroda et al. |
| 6,618,398 | B1 | 9/2003 | Marchetti et al. |
| 6,636,721 | B2 | 10/2003 | Threadgill et al. |
| 6,658,010 | B1 | 12/2003 | Enns et al. |
| 6,820,132 | B1 | 11/2004 | Puente et al. |
| 6,968,394 | B1 | 11/2005 | El-Rafie |
| 6,978,116 | B2 | 12/2005 | Burr et al. |
| 8,284,774 | B2 | 10/2012 | Roberts et al. |
| 2001/0000457 | A1 | 4/2001 | Hinderks et al. |
| 2001/0038686 | A1 | 11/2001 | Hinderks |
| 2002/0082827 | A1 | 6/2002 | Wiese |
| 2002/0105955 | A1 | 8/2002 | Roberts, III et al. |
| 2002/0166126 | A1 | 11/2002 | Pugh et al. |
| 2002/0177914 | A1 | 11/2002 | Chase |
| 2002/0194364 | A1 | 12/2002 | Chase et al. |
| 2007/0202800 | A1 | 8/2007 | Roberts et al. |

FOREIGN PATENT DOCUMENTS

| | | |
|---|---|---|
| DE | 33 13 841 | 10/1984 |
| DE | 34 40 613 | 4/1986 |
| DE | 36 38 922 | 5/1988 |
| DE | 36 45 150 | 5/1988 |
| DE | 42 37 366 | 5/1994 |
| EP | 0 139 803 | 5/1985 |
| EP | 0 174 636 | 3/1986 |
| EP | 0 271 805 | 6/1988 |
| EP | 0 343 792 | 11/1989 |
| EP | 0 372 601 | 6/1990 |
| EP | 0 510 247 | 8/1991 |
| JP | 63-128829 | 6/1988 |
| JP | 63-240228 | 10/1988 |
| JP | 1-188043 | 7/1989 |
| JP | 1-309489 | 12/1989 |
| JP | 3-278730 | 12/1991 |
| JP | 4-134995 | 5/1992 |
| JP | 5-103233 | 4/1993 |
| JP | 6-276169 | 9/1993 |
| JP | 5227164 | 9/1993 |
| JP | 5-290442 | 11/1993 |
| JP | 7-154347 | 11/1993 |
| JP | 6-133220 | 5/1994 |
| JP | 6-141005 | 5/1994 |
| JP | 7-153243 | 6/1995 |
| JP | 11-103292 | 4/1999 |
| JP | 11-289528 | 10/1999 |
| JP | 2000-115047 | 4/2000 |
| JP | 2000-251407 | 9/2000 |
| JP | 2003-116114 | 4/2003 |
| WO | WO 89/09965 | 10/1989 |
| WO | WO 92/10040 | 6/1992 |
| WO | WO 92/12599 | 7/1992 |
| WO | WO 92/17948 | 10/1992 |
| WO | WO 93/02412 | 2/1993 |
| WO | WO 93/09631 | 5/1993 |
| WO | WO 95/23493 | 8/1995 |
| WO | WO 96/08095 | 3/1996 |
| WO | WO 96/32710 | 10/1996 |
| WO | WO 96/32805 | 10/1996 |
| WO | WO 97/07606 | 2/1997 |
| WO | WO 97/09801 | 3/1997 |
| WO | WO 97/48051 | 12/1997 |
| WO | WO 98/15887 | 4/1998 |
| WO | WO 98/20724 | 5/1998 |
| WO | WO 00/25482 | 5/2000 |
| WO | WO 02/069073 | 9/2002 |

OTHER PUBLICATIONS

Bradenburg et al., "ISO-MPEG-1 Audio: A Generic Standard for Coding of High-Quality Digital Audio," J. Audio Eng. Soc., 1994, 42(10), 780-792.

Matsumoto et al., "120/140 Mbit/s Portable HDTV Codec and its Transmission Performance in a Field Trail via INTELSAT Satellite," 8376 Signal Processing Image Communication, Elsevier Science Publishers, 4(4/5), xp000293754, Aug. 1, 1992, 359-377.

De Moraes et al., "The Internet Multicast from ITS: How it was Done and Implications for the Future," IEEE Communications Magazine, Jan. 1995, 6-8.

Laczko, F., "The Motion Pictures Experts Group Digital Compression Standard and its Role in Satellite Systems," Proceedings of 1993 IEEE National Telesystems Conference, xp002163561, Jun. 16-17, 1993, 117-119.

(56) References Cited

OTHER PUBLICATIONS

Le Gall, D., "MPEG: A Video Compression Standard for Multimedia Applications," Communications of the Association for Computing Machinery, xp000228788, Apr. 1, 1991, 34(4), 46-58.
297 Pohlmann, K.C., "Principles of Digital Audio," McGraw-Hill Video/Audio Professional, 4th ed., 2000, 482-483.
Sharma, M.L., "MCPC VSAT's for Rural Network," Digital Satellite Communications, 10th International Conference, 1995, 484-490.
Yang et al., "Modeling and Performance Analysis of File Transfer in a Satellite Wide Area Network," IEEE Journal on Selected Areas in Communications, 1992, 10(2), 428-436.
Starguide Digital Networks, Inc. "StarGuide II Digital Multimedia Satellite Receiver," 1996, USA, 2 pages.
Starguide Digital Networks, Inc. "StarGuide MX3 Digital Multimedia Multiplexer," 1996, USA, 2 pages.
Starguide Digital Networks, Inc. "Musicam MPEG Layer II Digital Audio Decoder Module," 1996, USA, 2 pages.
Starguide Digital Networks, Inc. "MPEG 2 Digital Video Decoder Module ," 1996, USA, 2 pages.
Starguide Digital Networks, Inc., "RS-422, v. 35, RS-232C Synchronous Data Clear Channel Interface Module," 1996, USA, 2 pages.
Starguide Digital Networks, Inc., "RS-232 Asynchronous Services Statistical Demux Interface Module," 1996, USA.
"Infinity Boards the Musicam Express" Radio Ink, May 8-21, 1995, pp. 10.
"What is DaX?" Brochure, Copyright 1995, by Virtex Communications, L.L.C. (predecessor to StarGuide Digital Networks, Inc.).
"StarGuide II" Brochure, by Virtual Express Communications, L.L.C., Copyright 1995.
"Musicam Express" Brochure, by Virtual Express Communications, L.L.C., Copyright 1995.
"Installation and Operation of the DaX," StarGuide Digital Networks, Inc., Apr. 25, 1995, pp. 1-16.

High bandwidth data moves through this diagram from left to right. Low bandwidth data moves from the right to the left through a less reliable internet connection. As client PC's request data, the responses are routed through the satellite head-end to the client through the ethernet card.

A) TCP/IP Ethernet Packets Including IGMP Multicasting (Sourced from Either Local Content Servers or the Internet)

B) Serial Port On Router. Data Is HDLC Encapsulated TCP/IP Packets Transmitted Via RS-422 Signals.

C) 70MHz IF QPSK or BPSK Modulated Signal

D) Demultiplex the MX3 Stream to Recover the Individual Service Data Streams

E) Recovers Original TCP/IP Data Packets by Removing HDLC Encapsulation. Do Address Filtering and Pass Resulting TCP/IP Packets to Ethernet F) Normal Internet Traffic Including Responses to the Client PC's Requests

FIG. 8B

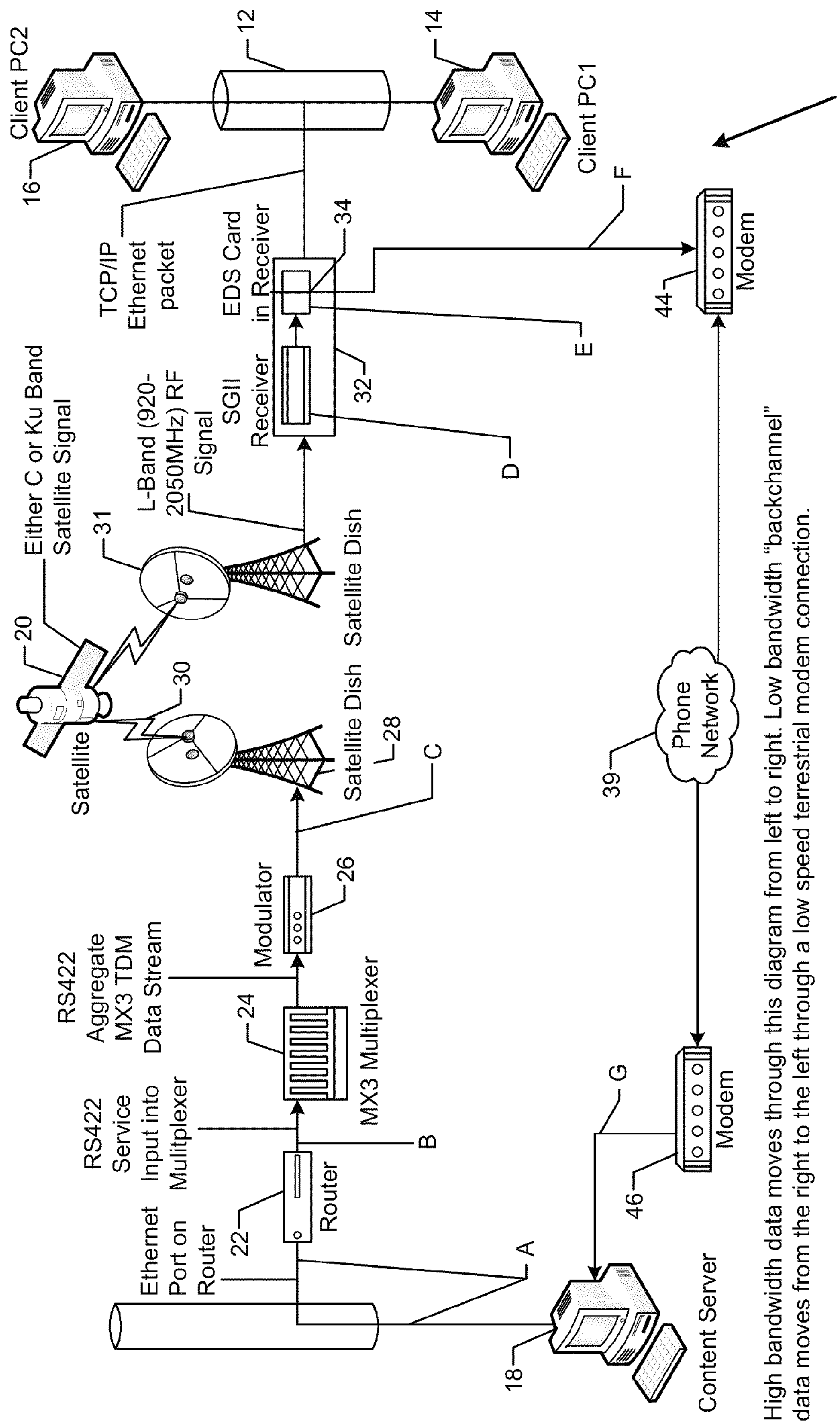

FIG. 9A

High bandwidth data moves through this diagram from left to right. Low bandwidth "backchannel" data moves from the right to the left through a low speed terrestrial modem connection.

For TCP/IP data, requests for data are generated by the client PC's (for example, Client PC1), routed via the ethernet card through the terrestrial backchannel. The data is routed from the content server over the satellite channel (high speed) and routed by the ethernet card to the appropriate client PC.

A) TCP/IP Ethernet Packets Including IGMP Multicasting (Sourced from Either Local Content Servers or the Internet)

B) Serial port on router. Data is HDLC encapsulated TCP/IP packets transmitted via RS-422 signals.

C) 70MHz IF QPSK or BPSK Modulated Signal

D) Demultiplex the MX3 Stream to Recover the Individual Service Data Streams

E) Recovers Original TCP/IP Data Packets by Removing HDLC Encapsulation. Do Address Filtering and Pass Resulting TCP/IP Packets to Ethernet G) TCP/IP Packets Received from Remote Sites F) TCP/IP Packets Addressed for Head-End Server or Remote Gateway Routed from LAN to RS232 Serial Stream

FIG. 9B

ETHERNET DIGITAL STORAGE (EDS) CARD AND SATELLITE TRANSMISSION SYSTEM

CROSS REFERENCE TO RELATED APPLICATIONS

This application is a continuation of Ser. No. 11/624,636, filed Jan. 18, 2007, which is a continuation of Ser. No. 09/425,118, filed Oct. 22, 1999, which claims benefit to U.S. Provisional Patent Application Ser. No. 60/105,468, filed Oct. 23, 1998, entitled "Apparatus and Method Of Use For Local Receiver Storage, Decoding and Output" and which is a continuation-in-part of U.S. Utility patent application Ser. No. 09/287,200, filed Apr. 3, 1999, now U.S. Pat. No. 6,160,797 issued Dec. 12, 2000, entitled "Satellite Receiver/Router, System, and Method of Use" which claims benefit to two prior provisional U.S. patent applications; (i) Ser. No. 60/080,530, filed Apr. 3, 1998, entitled "Ethernet Satellite Delivery Apparatus"; and (ii) Ser. No. 60/105,878, filed Oct. 27, 1998, entitled "Ethernet Satellite Delivery Apparatus". The disclosures of all the aforementioned applications are incorporated herein by reference.

BACKGROUND

The present invention generally relates to an Ethernet Digital Storage (EDS) Card, satellite transmission system, and method for data delivery or advertising. More particularly, the present invention relates to an EDS Card for receiving, storing, and transmitting files including video, audio, text, and multimedia files, especially files received via satellite transmission.

The effort to develop a system for error-free, time-crucial distribution of bandwidth consumptive files has driven the data delivery industry for some time. Within the broadcasting industry, especially radio broadcasting, private network systems have been developed to facilitate the distribution of audio files for subsequent radio broadcasting. These private network systems often use satellites as "bent-pipes" to deliver their content reliably and quickly. These private network systems have evolved from primitive repeaters to systems allowing the receiving station greater degrees of interaction and reliability.

The Internet is an enormous network of computers through which digital information can be sent from one computer to another. The Internet's strength its high level of interconnectivity also poses severe problems for the prompt and efficient distribution of voluminous digital information, particularly digitized imaging, audio, or video information, such as an audio broadcast transmission. Internet service providers (ISP's) have attempted to accelerate the speed of delivery of content to Internet users by delivering Internet content (e.g., TCP/IP packets) to the user through a satellite broadcast system. One such system is the direct to home ("DTH") satellite delivery system such as that offered in connection with the trademark, "DirecPC." In these DTH types of systems, each subscriber or user of the system must have: (i) access to a satellite dish; (ii) a satellite receiver connected to the satellite dish and mounted in the user's PC; and (iii) an Internet back channel in order to request information from Internet Web sites. The DTH system is thus quite costly, since each user must have its own receiver and connection to a satellite dish. The DTH system is also somewhat difficult to deploy since the satellite antenna and receiver is mounted in each DTH user's PC.

The DTH system also does not take advantage of pre existing satellite systems, and it often is a single carrier system, dedicated to the delivery of Internet content to the user. It does not allow the user flexibility to receive, much less distribute to others, other types of services, such as non Internet radio broadcast or faxing services for example. The DTH systems also typically modify the IP packets at the head end, thus introducing significant processing delay through the need to reconstruct packets on the receiving end.

DTH systems typically utilize the DVB standard, in which event the system might broadcast other services. DVB systems, however, utilize a statisitical data carrier. For this and other reasons, the DVB systems often cause significant additional delay due to the need to reconstruct packets from the statistically multiplexed carrier sent through DVB system. DTH system also add significant overhead to the data stream they provide, thus requiring additional bandwidth and associated costs in order to processes and deliver DVB data streams.

The DTH system is also typically quite limited in its bandwidth capabilities. The consumer DirecPC system, for example, is limited to 440 kbps, thus limiting its effectiveness as a reliable, flexible, and quick distribution vehicle for Internet content, particularly voluminous content, to all users of the system through the one carrier.

Another system used by ISP's and others to deliver Internet content through satellites is the use of commercial or professional quality satellite receivers in conjunction with traditional Internet routers connected into an ISP LAN or similar LAN for delivery of the received content through its LAN to its subscribers either on the LAN or through modems and telecommunications lines interconnecting the modems. (See Prior Art FIG. 3.) These types of separate receiver and router satellite systems have typically required use of traditional satellite data receivers with integrated serial (often RS 422) interfaces or data outputs. The data output is connected into the router, which then converts the data into Ethernet compatible output and routes and outputs the Ethernet onto the LAN.

The applicant has discovered that these prior art data receiver and separate router systems present many problems. For example, the traditional data receivers are relatively inflexible and support only one or two services; and the use of a separate router is expensive. In addition, these types of systems usually employ a DVB transport mechanism, which not well suited to transmitting Internet and similar types of content for a number of reasons. One reason is that, as noted above, the DVB transport protocol and mechanism add substantial delays into the system. Another is that, as the applicant has discovered, the DVB transport mechanism utilizes excessive amounts of bandwidth.

In addition, prior art data receiver and separate router systems often employ a separate storage memory, often linked to the router via a Local Area Network (LAN) which adds further expense, complication, and bandwidth consumption. Also, prior art systems are often awkward to adjust, to the extent that the prior art systems are adjustable at all. Additionally, prior art receivers typically are unable to provide multicasting and expensive multicasting routers must be added to the system to support multicasting.

The applicants have attempted to solve many problems through the development of several prior art satellite data transmission systems and modules, available from StarGuide Digital Networks, Inc. of Reno, Nev., that may be added to a receiver including an Asynchronous Services Statistical Demux Interface Module, a Digital Video Decoder Module, an MX3 Digital Multimedia Multiplexer, a Digital Audio Storage Module, and a Digital Multimedia Satellite Receiver. However, cost, efficiency, and reliability may still be improved.

Additionally, in the field of broadcasting, advertising is a major source of revenue. However, radio broadcasting of several types of advertising, such as national advertising campaigns, is often disfavored, In national advertising campaigns, advertising "spots" are often localized to the region in which the spot will be played. For example, an advertising spot to be run in Chicago might be localized by including voice content from a Chicago personality, or including a reference to Chicago. Spot localization and distribution is extremely cumbersome in prior art systems. Often prior art systems require audio tapes to be generated at a centralized location and then physically mailed to a local broadcaster, which is costly, labor intensive and not time effective. The development of a distribution system providing reliable, fast and efficient delivery of content as well as increased automation capability throughout the system may be of great use in data delivery enterprises such as nation ad campaign distribution and may lead to industry growth and increased profitability. For example, increased automation, ease of use and speed of distribution of a national ad campaign to a number of local broadcasters may allow increased broadcast advertising and may draw major advertising expenditures into national broadcasting advertising campaigns.

SUMMARY

The present invention provides an Ethernet Digital Storage (EDS) Card operable in a satellite data transmission system for storing and routing any kind of data including audio, video, text, image or multimedia files. Use of the present invention provides a satellite data transmission system with the ability to receive a multiplexed data stream of a variety of files, such as audio, video, data, images, and other multimedia files. Received files may be demultiplexed and stored automatically on the EDS Card locally in a flash memory storage. Files stored in the flash memory storage may be retrieved later. Alternatively, received files may be routed by the EDS Card over a network such as a Local Area Network (LAN). In a preferred embodiment, audio files may be retrieved, mixed with external audio, further manipulated and output as audio output. All files stored in the flash memory storage may be transmitted externally via an Ethernet Port, an M&C Port or a modem-enabled Auxiliary RS-232 Port. In addition to a data stream received from a satellite, files may be uploaded to the flash memory storage via an Ethernet Port, an M&C Port or a modem-enabled Auxiliary RS-232 Port. The EDS Card provides efficient multicasting via an IGMP multicasting processor. The EDS Card includes an HTTP server and a DNS resolver allowing the operation of the EDS Card and the contents of the flash memory storage to be accessible remotely via a web browser. The EDS Card provides a satellite receiver with a digital data, video, or audio storage and local insertion device, web site, Ethernet output device and router.

These and many other aspects of the present invention are discussed or apparent in the following detailed description of the preferred embodiments of the invention. It is to be understood, however, that the scope of the invention is to be determined according to the accompanying claims.

Advantages of the Invention

It is an object of the present invention to provide an EDS card capable of storing any kind of data, not just audio data. For example, the EDS card may be used to store text, numbers, instructions, images or video data.

It is an object of the invention to distribute TCP/IP compatible content by satellite.

It is an advantage of the present invention that it provides an Ethernet/Router card that can be mounted in a satellite receiver quickly, easily, and economically.

It is another advantage of the present invention that it provides a satellite receiver with the capability of receiving TCP/IP compatible content and routing and distributing it onto a LAN or other computer network without need for a router to route the content onto the LAN or network.

It is still another advantage that the preferred card may be hot swappable and may be removed from the receiver without interfering with any other services provided by the receiver.

It is still another advantage of the present invention that the preferred card can be used in a receiver that can deliver other services, through other cards, in addition to those provided by the present invention itself. For example, other services, available from StarGuide Digital Networks, Inc. of Reno, Nev. that may be added to a receiver include an Asynchronous Services Statistical Demux Interface Module, a Digital Video Decoder Module, an MX3 Digital Multimedia Multiplexer, a Digital Audio Storage Module, a Digital Audio Decoder, and a Digital Multimedia Satellite Receiver.

A still further advantage is that it provides satellite distribution of TCP/IP compatible content, eliminating the need for each PC receiving the content through the receiver to have its own dish or its own satellite receiver.

An additional advantage is that the present invention provides satellite TCP/IP distribution to PC's without having a satellite receiver being mounted in a PC and subject to the instability of the PC environment.

Yet an additional advantage is that the present card can preferably provide data services in addition to delivery of Internet content. Another advantage is that the satellite receiver in which the card is inserted preferably can provide yet additional services through other cards inserted in slots in the receiver.

Another advantage is that existing networks of satellite receivers can be adapted to deliver Internet services by mere insertion of the present cards in the receivers without having to replace the existing networks.

It is also an advantage of the present invention that the present system and insertion card preferably provides the ability to deliver TCP/IP content to Ethernet LAN's without need for custom software.

Another advantage is the present invention is that, both the overall system and the Ethernet/Router card in particular, process IP packets without modification or separation of the contents of the packets. The applicants' satellite transmission system and the present Ethernet/Router card are thus easier to implement; and since they process each IP packet as an entire block with no need to reconstruct packets on the receiving end, the system and the Ethernet/Router card more quickly process and route the IP packets from the head end to an associated LAN on the receiving end.

Another advantage of the present invention is that the Ethernet portion of the card uses an auto-negotiating 10/100 BT interface so that the card can integrate into any existing 10 BT or 100 BT LAN.

Another advantage is that the present invention includes a PPP connection to tie into an external modem so that the card can be tied to a distribution network via telco lines. This connection can be used for distribution as well as automatic affidavit and confirmation.

Another advantage of the present invention is DHCP (Dynamic Host Configuration Protocol) which allows the card's IP address to be automatically configured on an existing LAN supporting DHCP. This eliminates the need too manually configure the card's IP address.

Another advantage of the present invention is that the DNS (Domain Name Service) protocol has been added to allow the card to dynamically communicate with host web servers no matter what their IP address is.

Another advantage of the present invention is that an HTTP server (web server) has been added to the card so that it can be configured or monitored via a standard Web Browser. Additionally, the files stored on the EDS CARD may be downloaded or upload via a standard web browser.

Another advantage of the present invention is that the EDS Card includes an analog audio input port to allow a "live" feed to be mixed/faded with the locally stored audio. Additionally, an analog output is provided to allow auditioning of the local feed.

Another advantage of the present invention is that the EDS Card has a relay input port that allows external command of the card's behavior. Additionally, the card may be commanded via an Ethernet link, an Auxiliary RS-232 Port, a Host Interface Processor, or an received data stream.

Another advantage of the present invention is that the EDS Card includes a scheduler which allows the card to act at predetermined times to, for example, play an audio file and, if desired, to automatically insert such content into another content stream being received and output by the receiver and card.

Another advantage is that the present invention includes an IGMP multicasting processor to provide efficient multicasting to an attached LAN. Alternatively, the IGMP multicasting processor may be configured to allow a local router to determine the multicast traffic.

Another advantage of the present invention is that the EDS Card includes a local MPEG Layer II decoder to allow stored audio files to be converter to analog audio in real time.

Another advantage of the present invention is that the EDS may be configured as a satellite WAN with minimal effort and external equipment.

Another advantage is that the present invention allows a network to deploy a receiver system with, for example, an audio broadcasting capability, and later add additional capability such as Ethernet output, etc., by adding the EDS card of the present invention. This prevents the user from having to replace the receiver, remove the audio card or utilize a separate satellite carrier for the transmission of differing content types.

There are many other objects and advantages of the present invention, and in particular, the preferred embodiment and various alternatives set forth herein. They will become apparent as the specification proceeds. It is to be understood, however, that the scope of the present invention is to be determined by the accompanying claims and not by whether any given embodiment achieves all objects or advantages set forth herein.

BRIEF DESCRIPTION OF THE DRAWINGS

The applicants' preferred embodiment of the present invention is shown in the accompanying drawings wherein.

Figure 7:
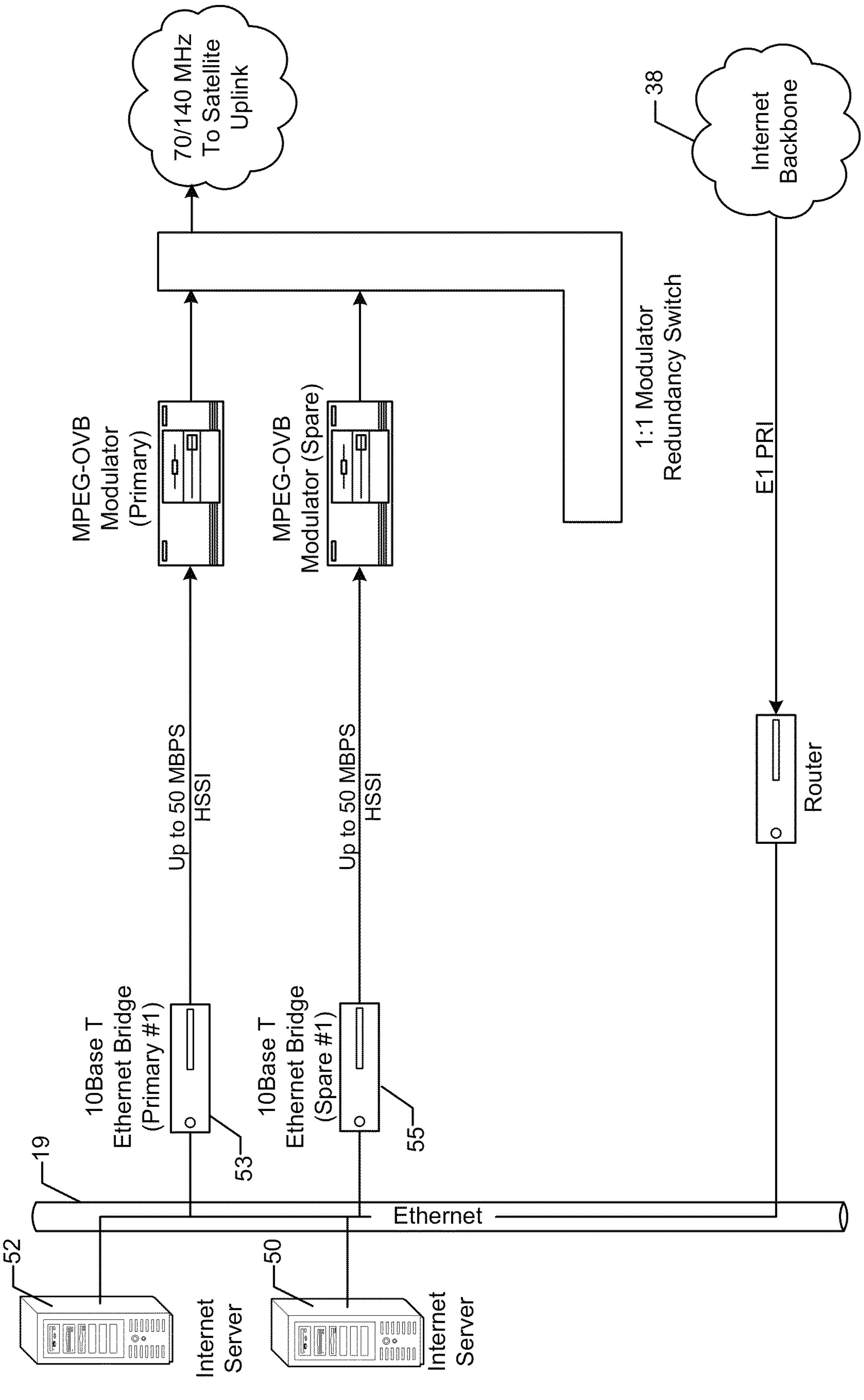
Figure 8A:
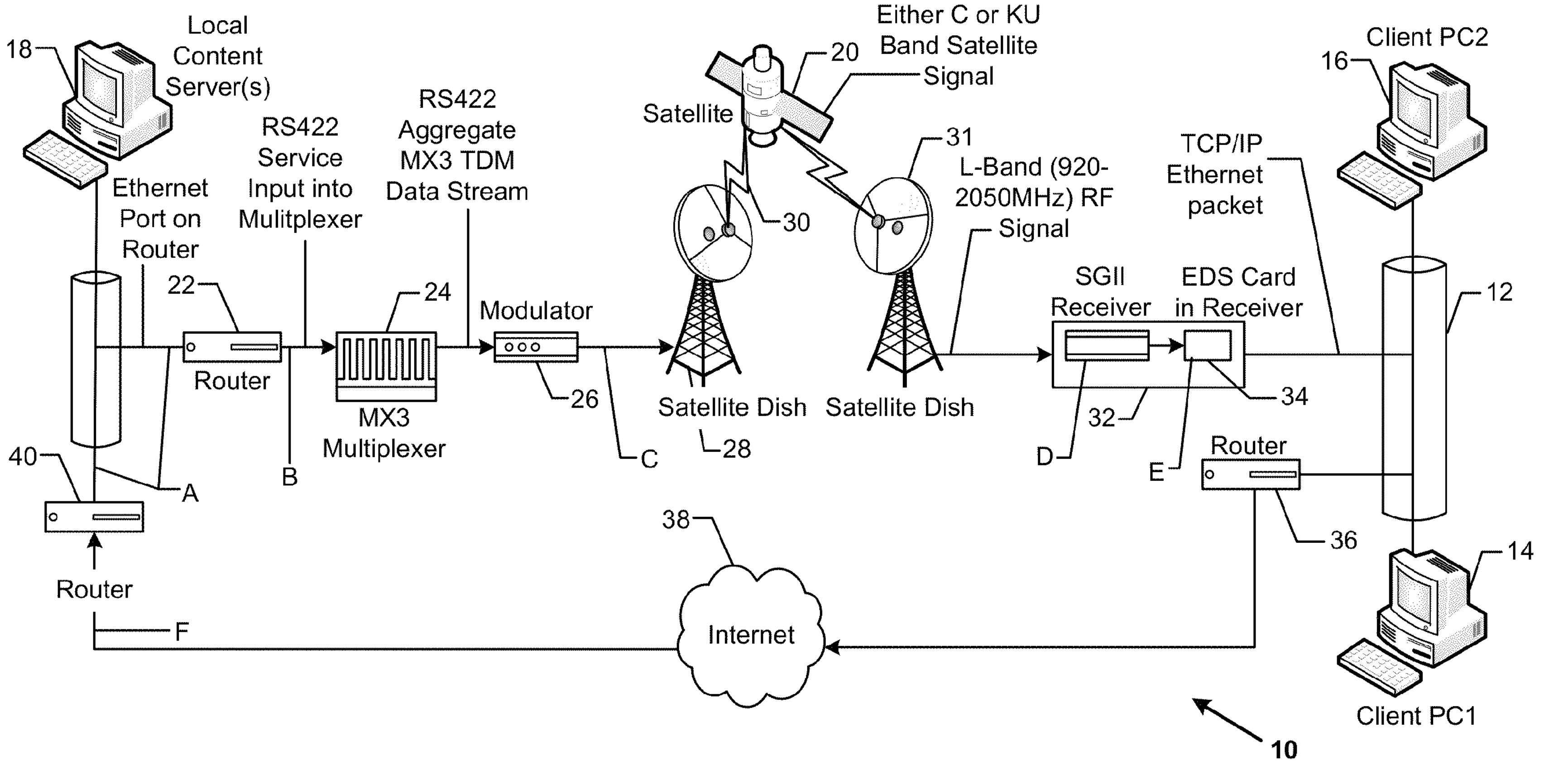
Figure 10:
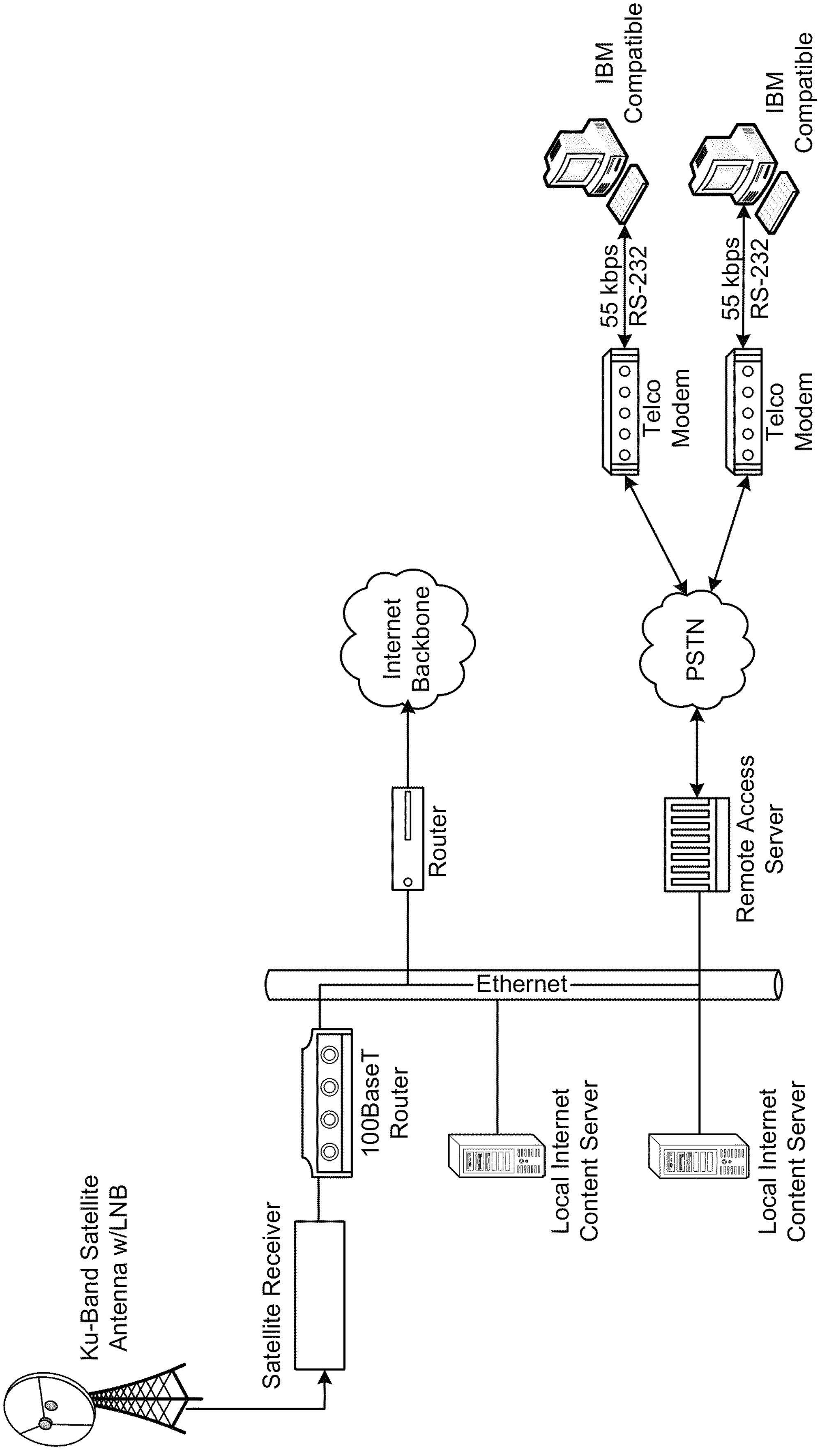
FIG. 10 (Prior Art)

Configuration for clear channel transmission of up to 10 mbps;

FIG. 7 is a block diagram of the applicants' preferred redundant uplink configuration for clear channel transmission of up to 50 mbps;

FIGS. 8A and 8B include a block diagram of one embodiment of the applicants' preferred satellite transmission system, with an Internet backchannel, in which the applicants' preferred EDS card has been inserted into a slot in a satellite receiver in order to distribute Internet content through the card onto an Ethernet LAN to which the card is connected;

FIGS. 9A and 9B include a block diagram of an alternative embodiment of the applicants' preferred satellite transmission system for distribution of TCP/IP content onto an intranet with a telecommunications modem provided backchannel from the receiver to the head-end of the intranet;

FIG. 10 is a block diagram of a prior art satellite data receiver, separate Internet router, and LAN, as described in the BACKGROUND section above.

Figure 1:
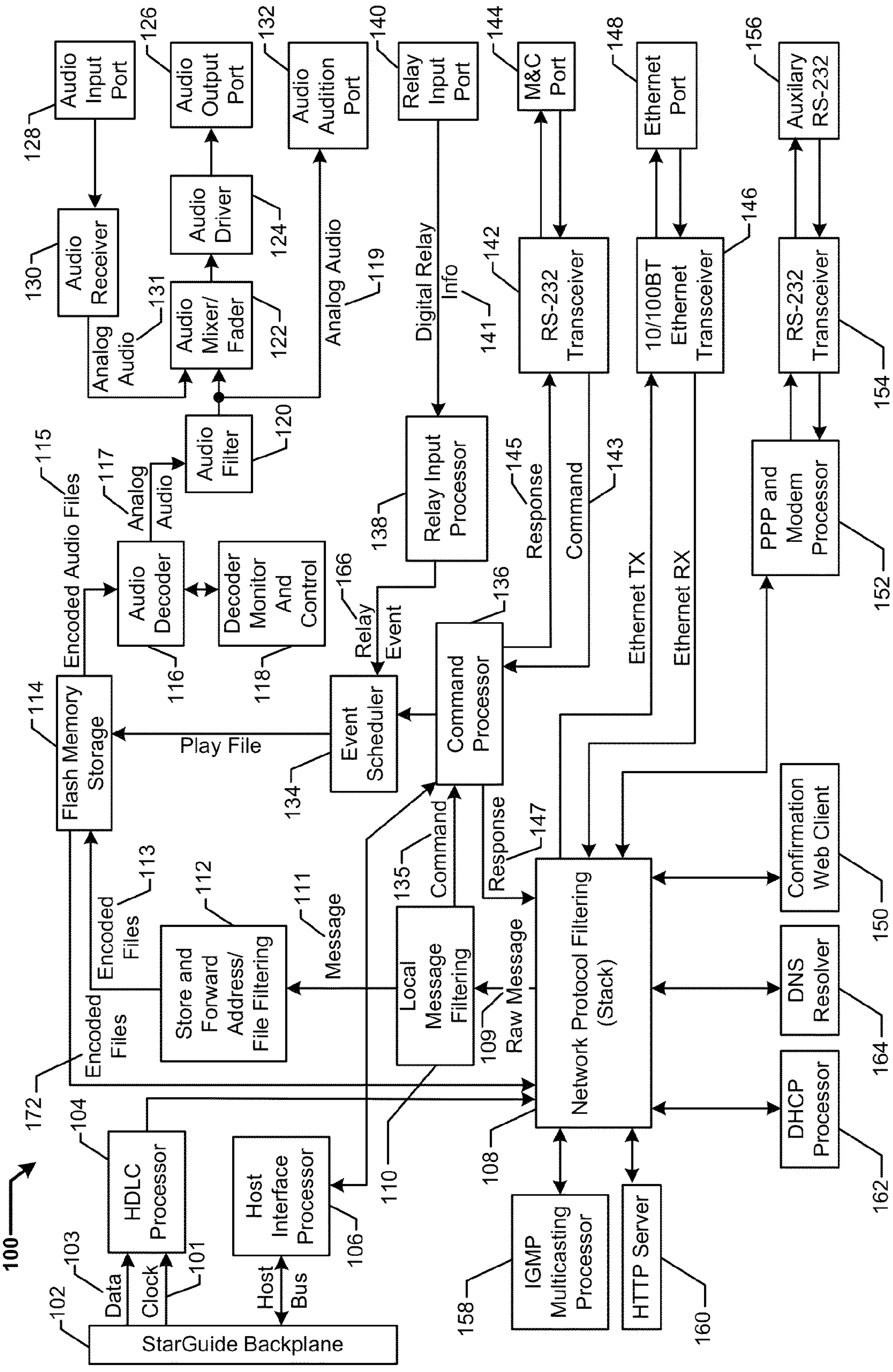
FIG. 1 illustrates a block diagram of the EDS card of the present invention.
Figure 11:
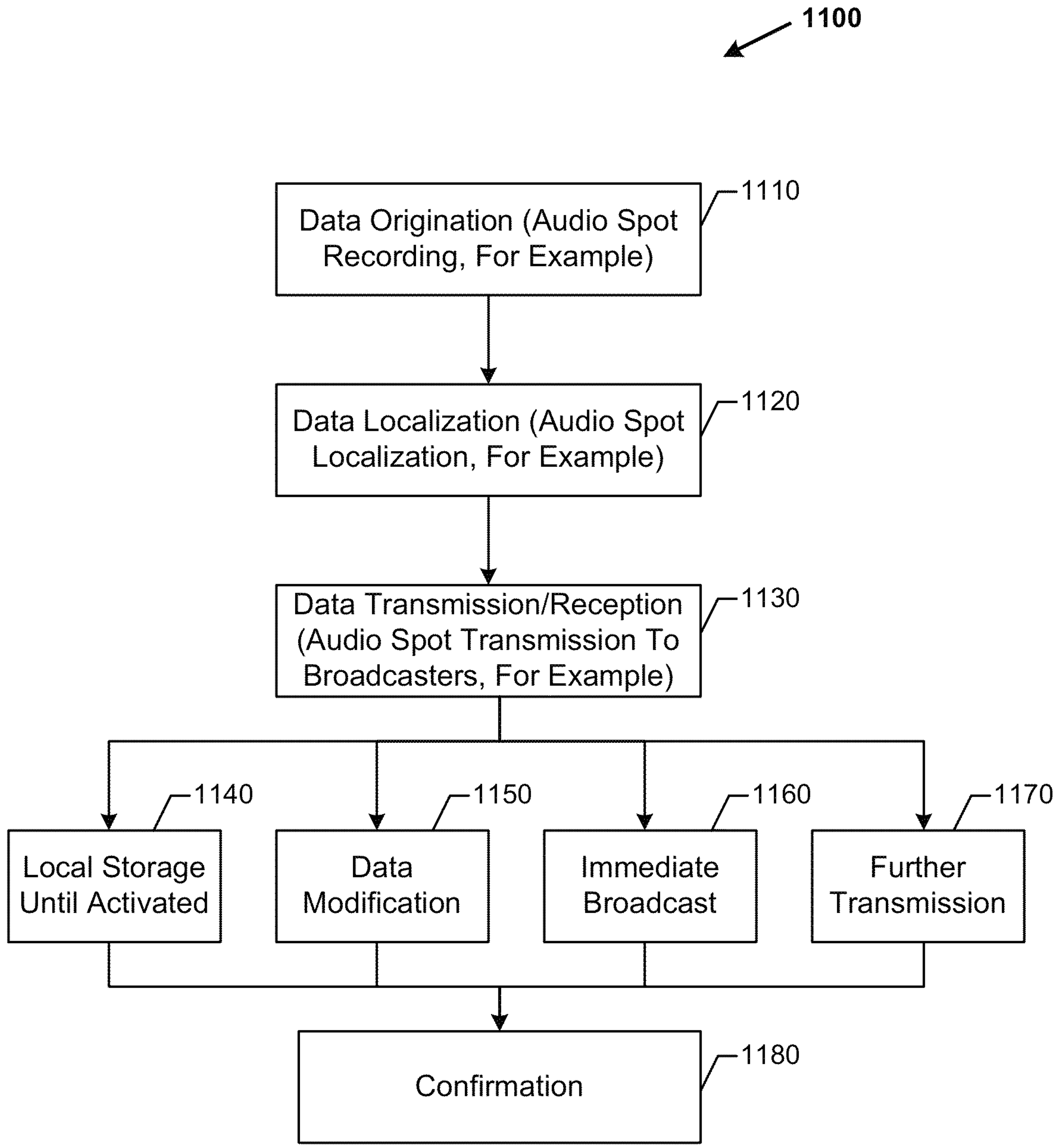

FIG. 11 illustrates a flowchart of the present invention employed to distribute data or content, for example, audio advertising, from a centralized origination location to a number of geographically diverse receivers. FIG. 1 is a diagram illustrating components used in accordance with an embodiment of the present invention;

DETAILED DESCRIPTION OF ILLUSTRATIVE EMBODIMENTS

FIG. 1 illustrates a block diagram of the EDS card 100. The EDS card 100 includes a StarGuide backplane 102, an HDLC Processor 104, a host interface processor 106, a Network Protocol Filtering (Stack) processor 108, a local message filtering processor 110, a Store and forward address/file filtering processor 112, a flash memory storage 114, an audio decoder 116, a decoder monitor and control processor 118, an audio filter 120, an audio mixer/fader 122, an audio driver 124, an audio output port 126, an audio input port 128, an audio receiver 130, an audio audition port 132, an event scheduler 134, a relay input processor 138, a relay input port 140, a RS-232 Transceiver 142, and M&C Port 144, a 10/100BT Ethernet Transceiver 146, an Ethernet Port 148, a confirmation web client 150, a PPP and modem processor 152, an RS-232 Transceiver 154, an Auxiliary RS-232 Port 156, an IGMP multicasting processor 158, an HTTP Server 160, a DHCP Processor 162, and a DNS Resolver 164.

In operation, the StarGuide backplane 102 interfaces with a receiver, preferably the prior art StarGuide® II Receiver (not shown), available from StarGuide Digital Networks, Inc., Reno, Nev. The Backplane 102 provides the EDS card 100 with a clock 101 and an HDLC packetized TCP/IP data stream 103. As mentioned above, the TCP/IP data stream may represent, audio, video, text, image or other multimedia information, for example. The clock 101 and the data stream 103 are provided to the HDLC processor 104 which depacketizes the data stream 103 and outputs TCP/IP packets to the network protocol filtering (stack) processor 108. The stack processor 108 may be configured to control the overall function and data allocation of the EDS card 100. The stack processor 108 may send the received data stream to any one of the IGMP multicasting processor 158, the HTTP Server 160, the DHCP Processor 162, the DNS resolver 164, the confirmation web client 150, the 10/100BT Ethernet Transceiver 146, the PPP and modem processor 152 or the local message filtering processor 110 as further described below. The stack processor 108 may be controlled by commands embedded in the data stream, commands sent through the M&C Port 144, commands sent through the Ethernet Port 148, commands through the Host interface processor 106, or commands received through the Auxiliary RS-232 port 156. These commands may be expressed in ASCII format or in the StarGuide Packet Protocol. The commands received by the stack processor 108 via the Ethernet Port 148 may use various interfaces including Simple Network Management Protocol (SNMP), Telnet, Hyper Text Transfer Protocol (HTTP) or other interfaces. The externally receivable operation commands for the stack processor 108 are set forth in APPENDIX A.

The stack processor 108 may further decode a received data stream to send a raw message 109 to the local message filtering processor 110. The local message filtering processor 110 determines if the raw message 109 is a content message such as audio, video, or text, for example, or a command message. The local message filtering processor 110 passes content messages 111 to the Store and forward address/file filtering processor 112 and passes command messages 135 to the command processor 136. The Store and forward address/file filtering processor 112 generates encoded files 113 which are passed to the flash memory storage 114.

The flash memory storage 114 stores the encoded files 113. encoded files stored in the flash memory storage 114 may be passed to the audio decoder 116 if the encoded files are audio files. Encoded files 172 other than audio files may be passed from the flash memory storage 114 to the stack processor 108 for further transmission. The flash memory storage 114 preferably stores at least up to 256 audio files or “spots”. The flash memory storage 114 preferably uses MUSICAM MPEG Layer II compression with a maximum spot size up to the storage capacity if the file stored is a compressed audio file. Other files, such as compressed video files, may be stored using MPEG2 compression or an alternative compression protocol. The storage capacity of the flash memory storage 114 is preferably at least 8 MB to 144 MB which is roughly equivalent to 8 to 144 minutes of digital audio storage at 128 kbps MPEG audio encoding. The flash memory storage 114 preferably supports insertion activation with the relay contract closure in absolute time and supports an insertion mode with or without cross-fading.

The audio decoder 116 decodes the encoded files 115 and generates an analog audio signal 117. The audio decoder 116 is monitored by the decoder monitor and control processor 118 while the audio decoder 116 decodes the encoded files 115. The analog audio signal 117 is passed to the audio filter 120 where the analog audio signal 117 is further filtered to increase its audio output quality. The audio decoder 116 includes an MPEG Layer II decoder allowing the pre-encoded stored files from the flash memory storage 114 to be converted to analog audio signals 117 in real time. The analog audio signal is then passed from the audio filter 120 to the audio mixer/fader 122 and the audio audition port 132. The analog audio signal 119 received by the audio audition port 132 may be passed to an external listening device such as audio headphones to monitor the audio signal. The audio audition port 132 of the EDS card allows the locally stored audio to be perceived without altering the output audio feed through the audio output port 126. The audio audition port 132 may be of great use when the audio output port 126 output is forming a live broadcast feed.

An external audio signal may be received by the audio input port 128. The external audio signal is then passed to the audio receiver 130 and the resultant analog audio signal 131 is passed to the audio mixer/fader 122. The audio mixer/fader may mix or fade an external analog audio signal 131 (if any) with the audio signal received from the audio filter 120. The output of the audio mixer/fader is then passed to the audio driver 124 and then to the audio output port 126. Also, the audio input port 128 allows a “live” audio feed to be mixed or faded at the audio mixer/fader 122 with a locally stored audio spot from the flash memory storage 114. The audio mixer/fader allows the live feed and the local (stored) feed to be mixed, cross faded or even amplified. Mixing entails the multiplication of two signals. Cross fading occurs when two signals are present over a single feeds and the amplitude of a first signal is gradually diminished while the amplitude of a second signal is gradually increased. Mixing, amplification, and cross fading are well known to those skilled in the art.

As mentioned above, the flash memory storage 114 may store a large number of audio spot files in addition to files such as video, text or other multimedia, for example. Files stored in the flash memory storage 114 are controlled by the event scheduler 134. The event scheduler 134 may be controlled through the relay input processor 138 of the relay input port 140 or through the command processor 136. The command processor 136 may receive programming including event triggers or command messages through the local message filtering processor 110 and the stack processor 108 from the M&C Port 144, the Auxiliary RS-232 Port 156, the Ethernet Port 148, the received data stream 103, or the Host interface processor 106.

For example, with respect to audio spots stored in the flash memory storage 114, the audio spots may be triggered at a pre-selected or programmed time by the event scheduler 134. The event scheduler 134 may receive audio spot triggers from either the command processor 136 or the relay input processor 138. The command processor 136 may receive programming including event triggers from the M&C Port 144, the Auxiliary RS-232 Port 156, the Ethernet Port 148, the received data stream 103, or the Host interface processor 106. External audio spot triggers may be received directly by the relay input port 140 which passes digital relay info 141 of the audio spot trigger to the relay input processor 138. Additionally, the local message filtering processor 110 may detect a command message in the raw message 109 it receives from the stack processor 108. The command message detected by the local message filtering processor 110 is then passed to the command processor 136. Also, the command processor 136 may be programmed to trigger an event at a certain absolute time. The command processor 136 receives absolute time information from the StarGuide backplane 102.

Additionally, once the command processor 136 receives a command message, the command processor 136 sends a response message to the command originator. For example, when the command processor 136 receives a command message from the M&C Port 144, the command processor 136 sends a response message 145 to the M&C Port 144 via the RS-232 Transceiver 142. Similarly, when a command message is received from the Ethernet Port 148, Auxiliary RS-232 Port 156, or Host interface processor 106, the command processor 136 sends a response message through the stack processor 108 to the command originating port to the command originating device. When a command message is received from the received data stream 103, a response may be sent via one of the other communication ports 148, 156, 106 or no response sent.

In addition to activating audio spots, the event scheduler 134 may trigger the flash memory storage 114 to pass a stored encoded file 172 to the stack processor 108. The encoded file 172 may be audio, video, data, multimedia or virtually any type of file. The stack processor 108 may further route the received encoded file 172 via the Ethernet Port, 148, the Auxiliary RS-232 Port 156, or the M&C Port 144 to an external receiver. Additionally, the stack processor 108 may repackage the received encoded data file 172 into several different formats such as multicast via the GMP Multicasting Processor 158, or HTTP via the HTTP server 160, telnet, or SNMP for external transmission.

The 10/100BT Ethernet Transceiver 146 receives data from the stack processor 108 and passes the data to the Ethernet Port 148. The 10/100BT Ethernet Transceiver 146 and Ethernet Port 148 may support either 10BT or 100BT Ethernet traffic. The 10/100 BT Ethernet Transceiver 146 uses an auto-negotiating 10/100 BT interface so that the EDS card 100 may easily integrate into an existing 10BT or 100BT LAN. In addition to supplying data to an existing 10 BT or 100BT LAN via the Ethernet Port 148, the stack processor 108 may receive data from an external network via the Ethernet Port 148. External data passes from the Ethernet Port 148 through the 10/100BT Ethernet Transceiver 146 to the stack processor 108. The external data may constitute command messages or audio or video data for example.

The EDS card 100 also includes a PPP and modem processor 152. The PPP and modem processor may be used for bi-directional communication between the stack processor 108 and the Auxiliary RS-232 Port 156. The PPP and modem processor 152 reformats the data for modem communication and then passes the data to the RS-232 Transceiver 154 of the Auxiliary RS-232 Port 156 for communication to an external receiving modem (not shown). Data may also be passed from an external modem to the stack processor 108. The PPP and modem processor 152 allows the EDS card 100 to communicate with an external modem so that the EDS card may participate in a distribution network via standard telecommunications lines, for example. The PPP and modem processor 152 may be used for distribution as well as automatic affidavit and confirmation tasks.

The EDS card 100 also includes an Internet Group Multicasting Protocol (IGMP) Multicasting Processor 158 receiving data from and passing data to the stack processor 108. The IGMP multicasting processor 158 may communicate through the stack processor 108 and the Ethernet Port 148 or the Auxiliary RS-232 Port 156 with an external network such as a LAN. The IGMP multicasting processor 158 may be programmed to operate for multicasting using IGMP pruning, a protocol known in the art, for multicasting without using IGMP Pruning (static router) and for Unicast routing.

When the IGMP multicasting processor 158 is operated using the IGMP pruning, the IGMP multicasting processor 158 may be either an IGMP querier or a non-querier. When the IGMP multicasting processor 158 is operated as a querier, the IGMP multicasting processor 158 periodically emits IGMP queries to determine if a user desires multicasting traffic that the EDS Card 100 is currently receiving. If a user desired multicasting traffic, the user responds to the IGMP multicasting processor 158 and the IGMP multicasting processor 158 transmits the multicast transmission through the stack processor 108 to an external LAN. The IGMP multicasting processor 138 continues emitting IGMP queries while transmitting the multicast transmission to the external user and the external user continues responding while the external user desires the multicast transmission. When the user no longer desires the multicast transmission, the user ceases to respond to the IGMP queries or the user issues an IGMP "leave" message. The IGMP multicasting processor detects the failure of the user to respond and ceases transmitting the multicast transmission.

Under the IGMP Protocol, only one IGMP querier may exist on a network at a given time. Thus, if, for example, the network connected to the Ethernet Port 148 already has an IGMP enabled router or switch, the IGMP multicasting processor 158 may be programmed to act as a non-querier. When the IGMP multicasting processor 158 acts as a non-querier, the IGMP multicasting processor manages and routes the multicasting traffic, but is not the querier and thus does not emit queries. The IGMP multicasting processor 138 instead responds to commands from an external router.

When the IGMP multicasting processor 158 performs multicasting without using IGMP pruning, the IGMP multicasting processor 158 acts as a static router. The IGMP multicasting processor 158 does not use IGMP and instead uses a static route table that may be programmed in one of three ways. First, the IGMP multicasting processor 158 may be programmed to merely pass though all multicast traffic through the stack processor 108 to an external LAN. Second, the IGMP multicasting processor 158 may be programmed to pass no multicast traffic. Third, the IGMP multicasting processor 158 may be programmed with a static route table having individual destination IP address or ranges of destination IP addresses. Only when the IGMP multicasting processor 158 receives multicast traffic destined for an IP address in the static route table, the multicast traffic is passed to the external LAN.

When the IGMP multicasting processor 158 performs Unicast routing, the IGMP multicasting processor 158 acts as a static router wherein received traffic in not multicast and is instead delivered only to a single destination address. As when performing multicast routing without IGMP pruning, the IGMP Multicast Processor 158 uses a static route table and may be programmed in one of three ways. First, to merely pass through received traffic to its individual destination address. Second, to pass no Unicast traffic. Third, the IGMP multicasting processor 158 may be programmed with a static route table having individual destination IP addresses and the IGMP multicasting processor 158 may pass traffic only to one of the individual destination IP addresses.

The IGMP multicasting processor 158 may be programmed via the M&C Port 144, the Ethernet Port 148, the Auxiliary RS-232 Port 156, the Host interface processor 106 or the received data stream 103. Additionally, the IGMP multicasting processor 158 may multicast via the Auxiliary RS-232 Port 156 in addition to the Ethernet Port 148.

The EDS card 100 also includes an HTTP Server 160 (also referred to as a Web Server). The HTTP Server 160 receives data from and passes data to the stack processor 108. Data may be retrieved from the HTTP Server 160 by an external device through either a LAN communicating with the Ethernet Port 148 or a modem communicating with the Auxiliary RS-232 Port 156. Either the modem or the LAN may transmit an HTTP data request command to the stack processor 108 via their respective communication channels, (i.e., the PPP and modem processor 152 and the 10/100BT Ethernet Transceiver respectively). The stack processor 108 transmits the received data request command to the HTTP Server 160 which formats and transmits a response to the stack processor 108 which transmits the response back along the appropriate channel to the requester.

Preferably, the HTTP Server 160 may be used to allow the EDS Card 100 to be configured and monitored via a standard Web Browser accessible through both the Ethernet Port 148 or the Auxiliary RS-232 port. Additionally, the HTTP Server 160 allows a web browser access to the files stored in the flash memory storage 114. Files may be downloaded for remote play, may be modified and up loaded, or may be played through the web browser. Additionally, the event scheduler 134 may be controlled with a web browser via the HTTP Server 160. The HTTP Server 160 allows complete remote access to the functionality of the EDS Card 114 and the contents of the flash memory storage 114 through a convenient web browser. Additionally, the HTTP Server 160 allows new files to be uploaded to the flash memory storage 114 via a convenient web browser. Use of the HTTP Server 160 in conjunction with a web browser may be the preferred way of monitoring the function and content of the EDS Card 100 remotely.

The EDS card 100 also includes a DHCP Processor 162 receiving data from and passing data to the stack processor 108. The DHCP Processor 162 provides Dynamic Host Configuration Protocol services for the EDS card 100. That is, the DHCP Processor allows the EDS card's 100 IP address to be automatically configured on an existing LAN supporting DHCP. The DHCP Processor thus eliminates the need to manually configure the EDS card's 100 IP address when the EDS card 100 is operated as part of a LAN supporting DHCP. In operation, the DHCP Processor 162 communicates with an external LAN via the Ethernet Port 148. IP data is passed from the external LAN through the Ethernet Port 148 and 10/100 BT Ethernet Transceiver 146 and the stack processor 108 to the DHCP Processor 162 where the IP data is resolved and the dynamic IP address for the EDS card 100 is determined The EDS card's 100 IP address is then transmitted to the external LAN via the stack processor 108, 10/100BT Ethernet Transceiver 146 and Ethernet Port 148. Additionally, the DHCP Processor 163 determines if the external LAN has a local DNS server. When the external LAN has a local DNS server the DHCP Processor 163 queries the local DNS server for DNS addressing instead of directly quering an internet DNS server. Also, the DHCP Processor 162 allows the IP address for the EDS Card 100 to be dynamically reconfigured on an existing LAN supporting DHCP.

The EDS card 100 also includes a DNS Resolver 164 receiving data from and passing data to the stack processor 108. The DNS Resolver 164 provides Domain Name Service to the EDS card 100 to allow the EDS card to dynamically communicate with external host web servers regardless of the web server IP address. In operation, the DNS Resolver 164 communicates with an external host web server via the stack processor 108 and either the Ethernet Port 148 or the Auxiliary RS-232 Port 156. The DNS Resolver 164 receives IP address information from the external host web server and resolves mnemonic computer addresses into numeric IP addresses and vice versa. The resolved IP address information is then communicated to the stack processor 108 and may be used as destination addressing for the external host web server.

The EDS Card 100 also includes a confirmation web client 150 receiving data from and passing data to the stack processor 108. When a data file, such as an audio file, is received by the EDS Card 100, the confirmation web client 150 confirms that the EDS Card 100 received the data by communicating with an external server preferably an HTTP enabled server such as the StarGuide® server. The confirmation web client's 150 confirmation data may be transmitted via either the Ethernet Port 148, the Auxiliary Port 156 or both. Additionally, once a file, such as an audio spot is played or otherwise resolved, the confirmation web client 150 may also send a confirmation to an external server preferably an HTTP enabled server such as the StarGuide® server. The confirmation web client's 150 confirmation may be then be easily accessed via web browser from the HTTP enabled server.

The flash memory storage 114 operates in conjunction with the event scheduler 134 and the command processor 136 to provide audio insertion capability and support for manual and automatic sport insertion, external playback control via the relay input port 140, Cross-Fade via the audio mixer/fader 122 and spot localization. The command processor 136 also maintains a built-in log of audio spots played. The built-in log may be retrieved through the M&C Port 144, the Ethernet Port 148, or the Auxiliary RS-232 Port 156. The built-in log may assist affidavit collection for royalty or advertising revenue determination, for example.

The Host interface processor 106 receives data from and transmits data to the StarGuide backplane 102. The Host interface processor 106 allows the EDS Card 100 to be controlled via the front panel (not shown) of the receiver in which the EDS Card 100 is mounted. The Host interface processor 106 retrieves from the command processor 136 the current operating parameters of the EDS Card 100 for display on the front panel of the receiver. Various controls on the front panel of the receiver allow users to access locally stored menus of operating parameters for the EDS Card 100 and to modify the parameters. The parameter modifications are received by the Host Processor 106 and then transmitted to the command processor 136. The Host interface processor 106 also contains a set of initial operating parameters and interfaces for the EDS Card 100 to support plug-and-play setup of the EDS Card 100 within the receiver.

As described above, the EDS card 100 includes many useful features such as the following. The EDS card 100 includes the audio input port 128 to allow a "live" audio feed to be mixed or faded at the audio mixer/fader 122 with a locally stored audio spot from the flash memory storage 114. Also, the audio mixer/fader allows the live feed and the local (stored) feed to be mixed, cross faded or even amplified. Additionally, the EDS card's 100 relay input port 140 allows external triggering of the EDS card including audio event scheduling. Also, the event scheduler 134 allows the EDS card to play audio files at a predetermined time or when an external triggering event occurs. Additionally, the audio decoder 116 includes an MPEG Layer II decoder allowing the pre-encoded stored files from the flash memory storage 114 to be converted to analog audio signals 117 in real time. Also, the audio audition port 132 of the EDS card allows the locally stored audio to be perceived without altering the output audios feed through the audio output port 126. The audio audition port 132 may be of great use when the audio output port 126 output is forming a live broadcast feed.

The features of the EDS card 100 also include the ability to receive files from a head end distribution system (such as ExpressNet) based on the EDS card's unique stored internal address. Once the EDS Card 100 receives an ExpressNet digital package, the EDS Card 100 may send a confirmation via the Ethernet Port 148 or the Auxiliary RS-232 port 156 to the package originator. Also, the IGMP multicasting processor 158 of the EDS card 100 provides locally configured static routing which allows certain IP addresses to be routed from a satellite interface through the EDS card 100 directly to the Ethernet Port 148. Also, the EDS Card 100 supports a variety of communication interfaces including HTTP, telnet, and SNMP to allow configuration and control of the EDS Card 100 as well as downloading, uploading, and manipulation of files stored on the flash memory storage 114.

Additionally, because the traffic received by the EDS Card 100 is HDLC encapsulated, the traffic received by the EDS Card 100 appears as if it is merely arriving from a transmitting router and the intervening satellite uplink/downlink is transparent. Because of the transparency, the EDS Card 100 may be configured as a satellite Wide Area Network WAN with minimal effort and additional equipment.

In general, the EDS Card 100 is an extremely flexible file storage and transmission tool. The EDS Card 100 may be programmed through the Host interface processor 106, the M&C Port 144, the Auxiliary RS-232 Port 156, the received data stream 103, and the Ethernet Port 148. It may be preferable to program the EDS Card 100 through the Host interface processor 106 when programming from the physical location of the EDS card 100. Alternatively, when programming the EDS Card 100 remotely, it may be preferable to program the EDS Card 100 via the Ethernet Port 148 because the Ethernet Port 148 supports a much higher speed connection.

In addition, files such as audio, video, text, and other multimedia information may be received by the EDS card 100 through the received data stream 103, the M&C Port 144, the Auxiliary RS-232 Port 156, and the Ethernet Port 148. Preferably, files are transmitted via the received data stream 103 or the Ethernet Port 148 because the received data stream 103 and the Ethernet Port 148 support a much higher speed connection. Also, files such as audio, video, text and other multimedia information may be transmitted by the EDS card 100 through the M&C Port 144, the Auxiliary RS-232 Port 156, and the Ethernet Port 148. Preferably, files are transmitted via the Ethernet Port 148 because the Ethernet Port 148 supports a much higher speed connection. Audio files may also be transmitted via the audio output port 126 in analog form.

Additionally, the EDS Card 100 may perform time-shifting of a received data stream 103. The received data stream 103 may be stored in the flash memory storage 114 for later playback. For example, an audio broadcast lasting three hours may be scheduled to begin at 9 am, New York time in New York and then be scheduled to begin an hour later at 7 am. Los Angeles time in Los Angeles. The received data stream 103 constituting the audio broadcast may be received by an EDS Card in California and stored. After the first hour is stored on the California EDS Card, playback begins in California. The EDS card continues to queue the received audio broadcast by storing the audio broadcast in the flash memory storage while simultaneously triggering, via the event scheduler 134, the broadcast received an hour ago to be passed to the audio decoder and played.

Figure 2:
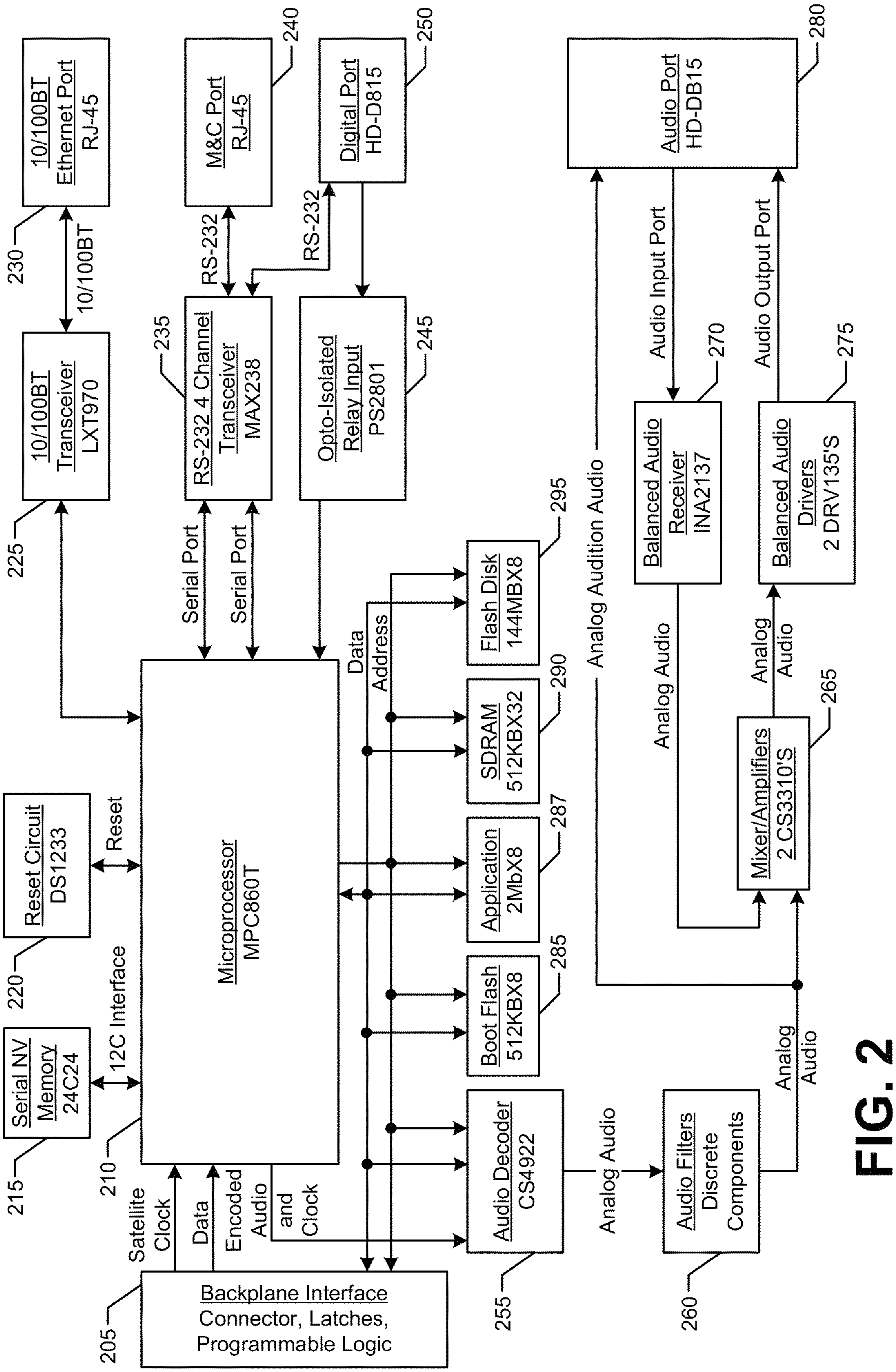
FIG. 2 illustrates a hardware block diagram of the EDS Card of the present invention.

FIG. 2 illustrates a hardware block diagram of the EDS Card 200. The EDS Card 200 includes a Backplane Interface 210, a Microprocessor 210, a Serial NV Memory 215, a Reset Circuit 220, a 10/100BT Transceiver 225, a 10/100BT Ethernet Port 230, a RS-232 4 Channel Transceiver 235, a M&C Port 240, an Opto-Isolated Relay Input 245, a Digital Port 250, an audio decoder 255, and audio filter 260, a Mixer/Amplifier 265, a Balanced Audio Receier 270, a Balanced audio driver 275, an Audio Port 280, a Boot Flash, 285, an Application Flash 287, an SDRAM 90, and a Flash Disk 295.

In operation, the Backplane Interface 205 performs as the StarGuide backplane 102 of FIG. 1. The Microprocessor 210 includes the HDLC Processor 104, the Host interface processor 106, the stack processor 108, the local message filtering processor 110, the Store and forward address/file filtering processor 112, the event scheduler 134, the command processor 136, the decoder monitor and control processor 118, the relay input processor 138, the confirmation web client 150, the PPP and modem processor 152, the IGMP multicasting processor 158, the HTTP Server 160, the DHCP Processor 162, and the DNS Resolver 164, as indicated by the shaded elements of FIG. 1. The Serial NV Memory 215 stores the initial command configuration used at power-up by the command processor 136. The Reset Circuit 220 ensures a controlled power-up. The 10/100BT Transceiver performs as the 10/100BT Ethernet transceiver 146 of FIG. 1 and the 10/100BT Ethernet Port 230 performs as the Ethernet Port 148 of FIG. 1. The RS-232 4 Channel Transceiver 235 performs as both the RS-232 Transceiver 142 and the RS-232 Transceiver 154 of FIG. 1. The Digital Port 250 in conjunction with the RS-232 Channel Transceiver 235 performs as the Auxiliary RS-232 Port 156 of FIG. 1. The M&C Port 240 performs as the M&C Port 144 of FIG. 1. The Opto-Isolated Relay Input 245 and the Digital Port 250 perform as the relay input port 140. The audio decoder 255, audio filters 260, Mixer/Amplifiers 265, Balanced audio receiver 270, Balanced audio drivers 275 and Audio Port 280 perform as the audio decoder 116, audio filter 120, audio mixer/fader 122, audio receiver 130, audio driver 124, and audio output port 126 respectively of FIG. 1. The Flash Disk 295 performs as the flash memory storage 114 of FIG. 1.

The Boot Flash 285, Application Flash 287, and SDRAM 290 are used in the start-up and operation of the EDS Card 100. The Boot Flash 285 holds the initial boot-up code for the microprocessor operation. When the Reset Circuit 220 is activated, the Microprocessor 210 reads the code from the Boot Flash 285 and then performs a verification of the Application Flash 287. The Application Flash 287 holds the application code to run the microprocessor. Once the Microprocessor 210 has verified the Application Flash 287, the application code is loaded into the SDRAM 290 for use by the microprocessor 210. The SDRAM 290 holds the application code during operation of the EDS Card 100 as well as various other parameters such as the static routing table for use with the IGMP Multicasting Microprocessor 158 of FIG. 1.

The microprocessor 210 is preferably the MPC860T microprocessor available from Motorola, Inc. The Reset Circuit 220 is preferably the DS1233 available from Dallas Semiconductor, Inc. The 10/100BT Ethernet Transceiver 225 is preferably the LXT970 available from Level One, Inc. The audio decoder 255 and the Mixer Amplifier 265 are preferably the CS4922 and CS3310 respectively, available from Crystal Semiconductor, Inc. The Flash Disk 295 is preferably a 144 Mbx8 available from M-Systems, Inc. The remaining components may be commercially obtained from a variety of vendors.

Figure 3:
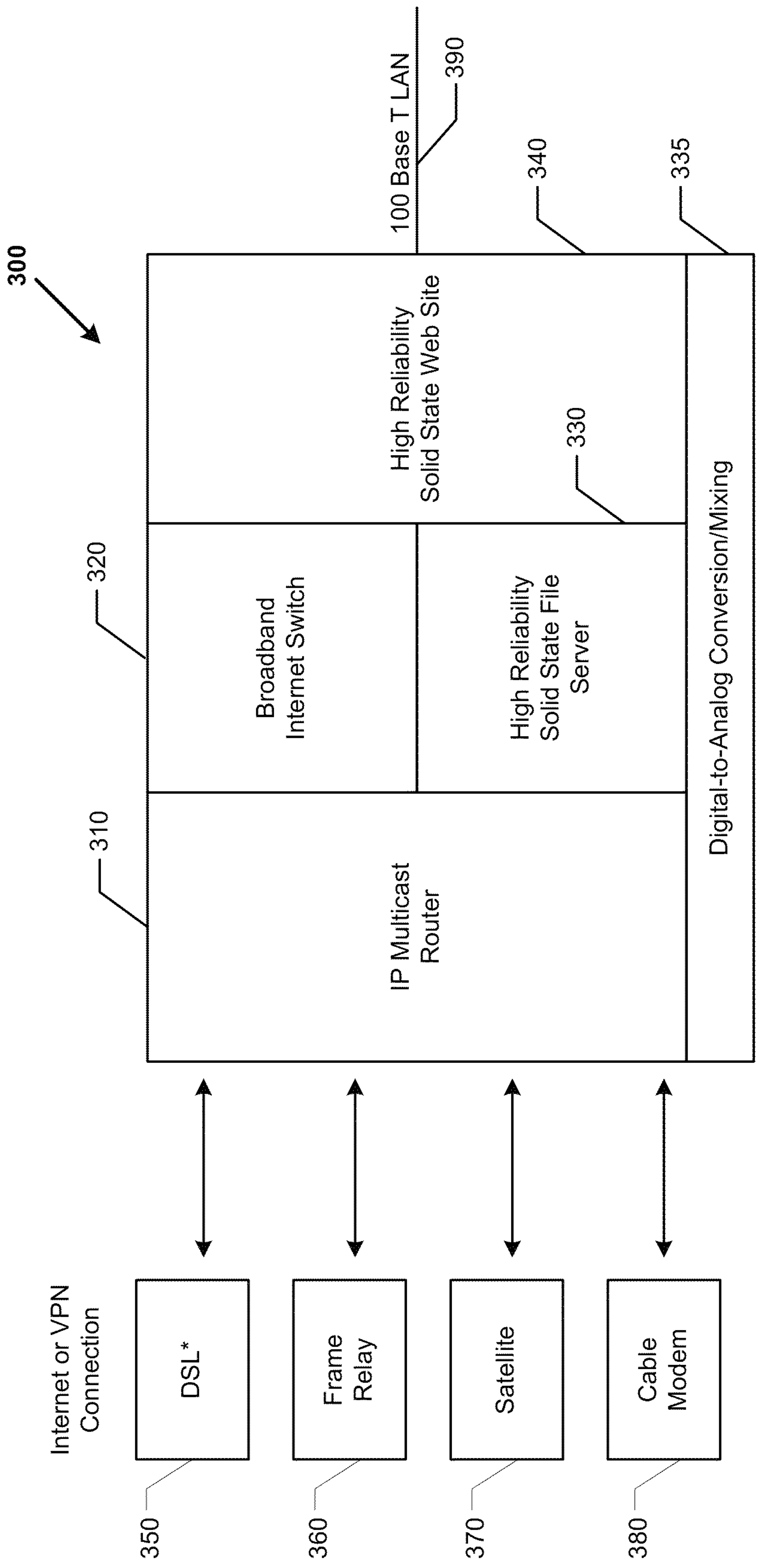
FIG. 3 further illustrates some of the functionality of the EDS Card of the present invention.

FIG. 3 further illustrates some of the functionality of the EDS Card 300 of the present invention. Functionally, the EDS card 300 of the present invention includes an IP Multicast Router 310, a Broadband Internet Switch 320, a High Reliability Solid State File Server 330, and a High Reliability Solid State Web Site 340. The EDS card 300 may receive data from any of a number of Internet or Virtual Private Network (VPN) sources including DSL 350, Frame Relay 360, Satellite 370, or Cable Modem 380. The EDS card 300 may provide data locally, such as audio data, or may transmit received data to a remote location via an ethernet link such as a 100 Base T LAN link 390 or via DSL 350, Frame Relay 360, Satellite 370, or Cable Modem 380. Data received by the EDS Card 300 may be routed by the IP Multicast Router 310, may be switched through the Broadband Internet Switch 320, or may be stored on the High Reliability Solid State File Server 330. The EDS card may be monitored and controlled via the High Reliability Solid State Website 340 which may be accessed via the 100 Base T LAN link 390, DSL 350, Frame Relay 360, Satellite 370, or Cable Modem 380.

Referring now to FIGS. 8A and 8B, the applicants' preferred Internet backchannel system 10 is preferably utilized to distribute Internet content (according to the TCP/IP protocol, which may include UDP packets) onto a remote LAN 12 interconnecting PC's, e.g., 14, 16, on the remote LAN 12. Through the applicants' preferred Internet satellite transmission system 10, content residing on a content server PC 18 is distributed according to the TCP/IP protocol through a third party satellite 20 to the client PC's 14, 16 on the remote Ethernet LAN 12.

In the applicants' preferred system 10, the TCP/IP content flow is as follows:

1. A PC, e.g., 14, on the remote Ethernet LAN 12 is connected to the Internet through a conventional, and typically pre existing, TCP/IP router 36 in a fashion well known to those skilled in the art. The router 36 can thus send requests for information or Internet content through the Internet 38 to a local router 40 to which a content server 18 (perhaps an Internet web server) is connected in a fashion well known to those skilled in the art.

2. The content server 18 outputs the Internet content in TCP/IP Ethernet packets for reception at the serial port (not shown) on a conventional Internet router 22;

3. The router 22 outputs HDLC encapsulated TCP/IP packets transmitted via RS422 signals at an RS 422 output port (not shown) into an RS 422 service input into a StarGuide® MX3 Multiplexer 24, available from StarGuide Digital Networks, Inc., Reno, Nev. (All further references to StarGuide® equipment refer to the same company as the manufacturer and source of the equipment.) The method of multiplexing utilized by the MX3 Multiplexer is disclosed in Australia Patent No. 697851, issued on Jan. 28, 1999, to StarGuide Digital Networks, Inc, and entitled Dynamic Allocation of Bandwidth for Transmission of an Audio Signal with a Video Signal."

4. The StarGuide® MX3 Multiplexer 24 aggregates all service inputs into the Multiplexer 24 and outputs a multiplexed TDM (time division multiplexed) data stream through an RS 422 port (not shown) for delivery of the data stream to a modulator 26, such as a Comstream CM701 or Radyne DVB3030, in a manner well known to those skilled in the art. The modulator 26 supports DVB coding (concatenated Viterbi rate N/(N+I) and Reed Solomon 187/204, QPSK modulation, and RS 422 data output). Multiple LANs (not shown) may also be input to the StarGuideg Multiplexer 24 as different services, each connected to a different service input port on the StarGuideg Multiplexer 24, 5. The modulator 26 outputs a 70 MHz RF QPSK or BPSK modulated signal to a satellite uplink and dish antenna 28, which transmits the modulated signal 30 through the satellite 20 to a satellite downlink and dish antenna 31 remote from the uplink 28.

6. The satellite downlink 31 delivers an L Band (920 205 OMHz) radio frequency (RF) signal through a conventional satellite downlink downconverter to a StarGuide® II Satellite Receiver 32 with the applicants' preferred Ethernet/Router card 34 removably inserted into one of possibly five available insertion card slots (not shown) in the back side of the StarGuide® II Receiver 32. The StarGuide® II Receiver 32 demodulates and demultiplexes the received transmission, and thus recovers individual service data streams for use by the cards, e.g., EDS Card 34, mounted in the StarGuide® II Receiver 32. The Receiver 32 may also have one or more StarGuide® cards including audio card(s), video card(s), relay card(s), or async card(s) inserted in the other four available slots of the Receiver 32 in order to provide services such as audio, video, relay closure data, or asynchronous data streams for other uses or applications of the single receiver 32 while still functioning as a satellite receiver/router as set forth in this specification. For example, other services, available from StarGuide Digital Networks, Inc. of Reno, Nev. that may be added to a receiver include an Asynchronous Services Statistical Demux Interface Module, a Digital Video Decoder Module, an MX3 Digital Multimedia Multiplexer, a Digital Audio Storage Module, and a Digital Multimedia Satellite Receiver.

7. The EDS Card 34 receives its data and clock from the StarGuide® II Receiver 34, then removes the HDLC encapsulation in the service stream provided to the EDS Card 34 by the StarGuide® II Receiver 32, and thus recovers the original TCP/IP packets in the data stream received from the Receiver 32 (without having to reconstruct the packets). The EDS Card 34 may then, for example, perform address filtering and route the resulting TCP/IP packets out the Ethernet port on the side of the card (facing outwardly from the back of the StarGuide® II Receiver) for connection to an Ethernet LAN for delivery of the TCP/IP packets to addressed PCs, e.g., 14, 16 if addressed, on the LAN in a fashion well to those skilled in the art. Alternatively, as discussed above, the EDS Card 34 may store the received packets on the flash memory storage 114 of FIG. 1 for example.

As a result, high bandwidth data can quickly move through the preferred satellite system 10 from the content server 18 through the one way satellite connection 20 to the receiving PC, e.g., 14. Low bandwidth data, such as Internet user requests for web pages, audio, video, etc., may be sent from the remote receiving PC, e.g., 14, through the inherently problematic but established Internet infrastructure 38, to the content server 18. Thus, as client PC's, e.g., 14, 16, request data, the preferred system 10 automatically routes the requested data (provided by the content server 12) through the more reliable, higher bandwidth, and more secure (if desired) satellite 20 transmission system to the StarGuide® II Receiver and its associated EDS Card 34 for distribution to the PC's 14, 16 without going through the Internet 38 backbone or other infrastructure.

Referring now to FIGS. 9A and 9B, the applicants' preferred intranet system 42 is preferably utilized to distribute TCP/IP formatted content onto a remote LAN 12 interconnecting PC's, e.g., 14, 16, on the remote LAN 12. Through the intranet system 42, content residing on a content server PC 18 is distributed through the intranet 42 to the client PC's 14, 16 through a private telecommunications network 39.

The intranet system 42 of FIG. 9A works similarly to the Internet system 10 of FIG. 1 except that the intranet system 42 does not provide a backchannel through the Internet 40 and instead relies on conventional telecommunications connections, through conventional modems 44, 46, to provide the backchannel. In the applicants' preferred embodiment the remote LAN modem 44 connects directly to an RS11 port on the outwardly facing side of EDS Card 34 on the back side of the StarGuide® II Receiver 32 in which the EDS Card 34 is mounted. The Ethernet/Router card 34 routes TCP/IP packets addressed to the head end or content server 18 (or perhaps other machines on the local LAN 19) to an RS232 serial output (113 in FIG. 8A) to the remote LAN modem 44 for delivery to the content servers or head end 18. Alternatively, the remote modem 44 may be connected to accept and transmit the TCP/IP data and requests from a client PC, e.g., 14, through a router (not shown) on the remote LAN 12, in a manner well known to those skilled in the art.

The local modem 46 is connected to the content server 18 or to a head end LAN on which the server 18 resides. The two modems 44. 46 thus provide a TCP/IP backchannel to transfer TCP/IP data and requests from PC's 14, 16 on the remote LAN (which could also be a WAN) 12 to the content server 18.

Figure 4:
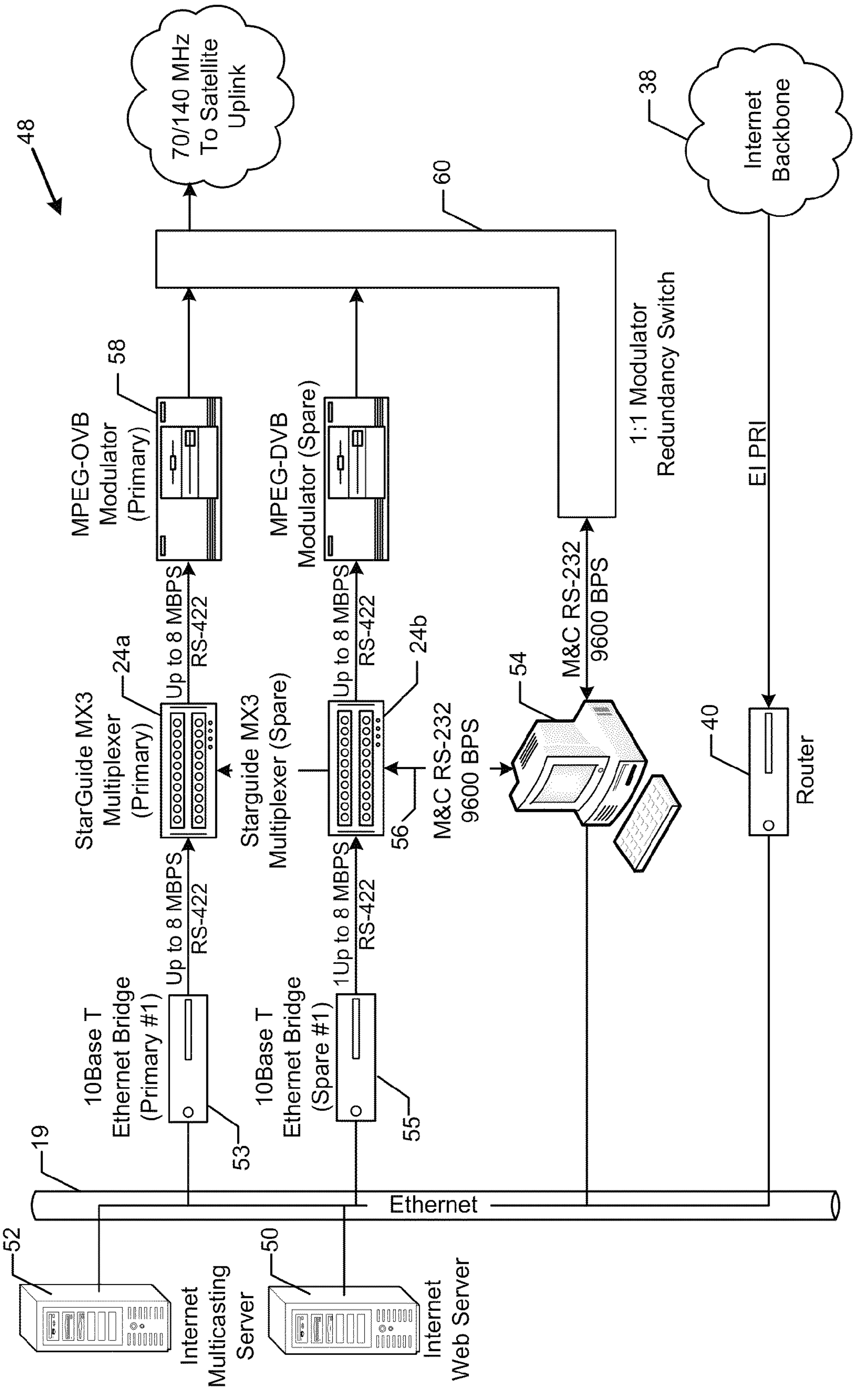
FIG. 4 is a block diagram showing the applicant's preferred uplink configuration utilizing a multiplexer to multiplex the satellite transmission.

Referring now to FIG. 4, the applicants' preferred "muxed" uplink system, generally 48, is redundantly configured. The muxed system 48 is connected to a local or head end Ethernet LAN 19, to which an Internet Web Server 50 and Internet Multicasting Server 52 are connected in a manner well known to those of skill in the art. Two 10BaseT Ethernet Bridges 53, 55 provide up to 8 mbps (megabits per second) of Ethernet TCP/IP data into RS422 service ports (not shown) mounted in each of two StarGuide® II MX3 Multiplexers 24*a*, 24*b*, respectively. The main StarGuide® Multiplexer 24*a* is connected via its monitor and control (M&C) ports (not shown) through the spare Multiplexer 24*b* to a 9600 bps RS 232 link 56 to a network management PC 54 running the Starguide Virtual Bandwidth Network Management System (VB-NMS).

Each of the Multiplexers, e.g., 24*a*, output up to 8 mbps through an RS422 port and compatible connection to an MPEG DVB modulator, e.g., 58. The modulators, e.g., 58, in turn feed their modulated output to a 1:1 modulator redundancy switch 60 and deliver a modulated RF signal at 70 to 140 MHz for transmission through the satellite (20 in FIG. 8A). In this regard, the VBNMS running on the network management PC 54 is also connected to the redundancy switch 60 via an M&C RS 232 port (not shown) on the redundancy switch 60.

Figure 5:
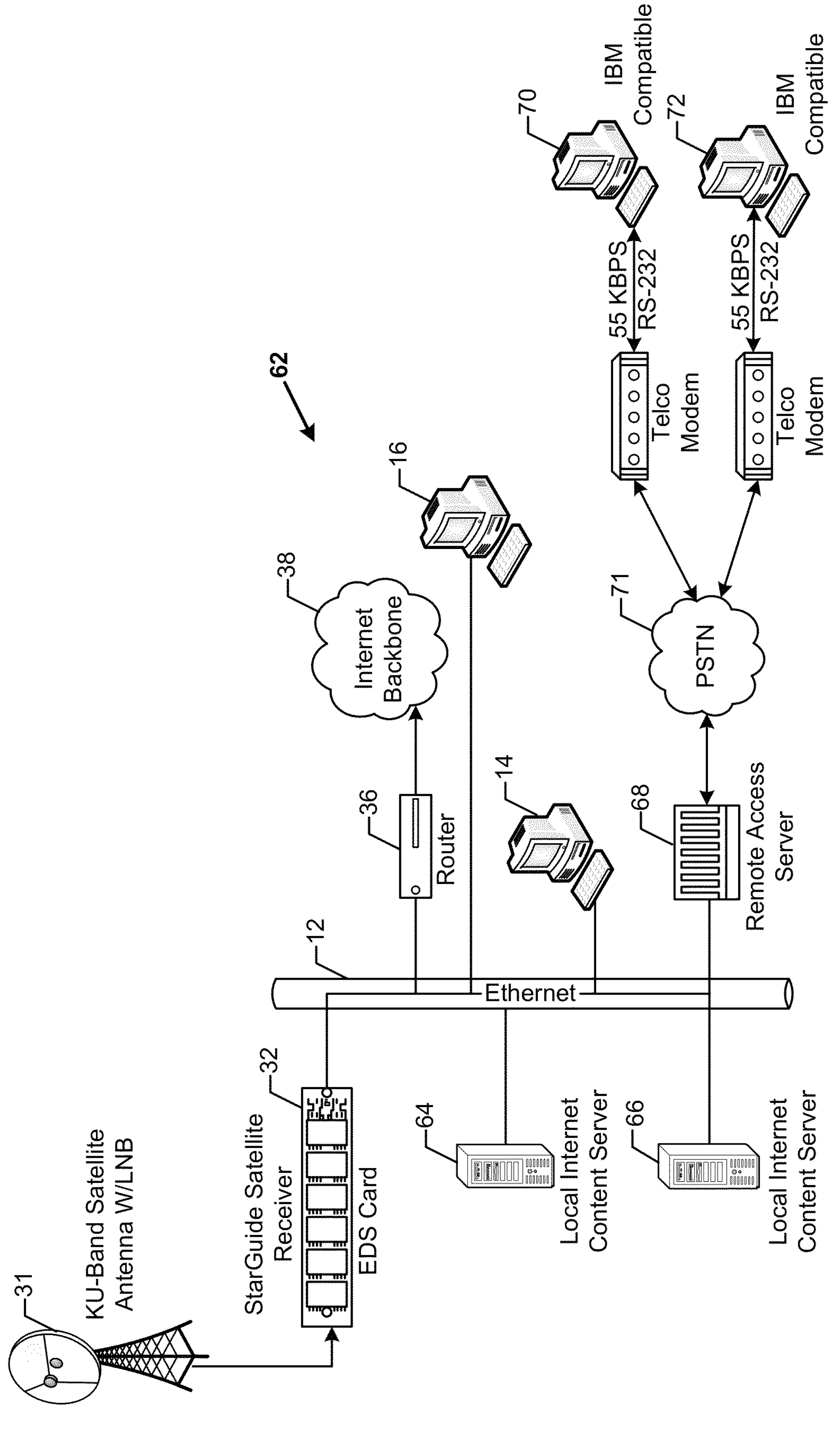
FIG. 5 is a block diagram of the applicants' preferred downlink configuration for reception of a multiplexed satellite transmission for distribution onto an associated LAN.

With reference now to FIG. 5, in the applicants' preferred muxed down-link generally 62, there is no need for a router between the StarGuide® II Satellite Receiver 32 and the remote LAN 12. The Receiver 32 directly outputs the Ethernet encapsulated TCP/IP packets from the Ethernet output port (not shown) on the Receiver 32 onto the LAN cabling 12 with no intermediary hardware at all other than standard in inexpensive cabling hardware.

The LAN 12 may also be connected to traditional LAN and WAN components, such as local content servers 64, 66, router (s), e.g., 36, and remote access server(s), e.g., 68, in addition to the LAN based PC's, e.g., 14, 16. In this WAN configuration, yet additional remotely connected PC's 70, 72, may dial in or be accessed on conventional telecommunications lines, such as POTS lines through a public switching teclo network (PTSN) 71 to procure TCP/IP or other content acquired by the remote access server 68, including TCP/IP content delivered to access server 68 according to addressing to a remotely connected PC, e.g., 70, of packets in the Ethernet data stream output of the Ethernet/Router card (34 in FIG. 8A).

Figure 6:
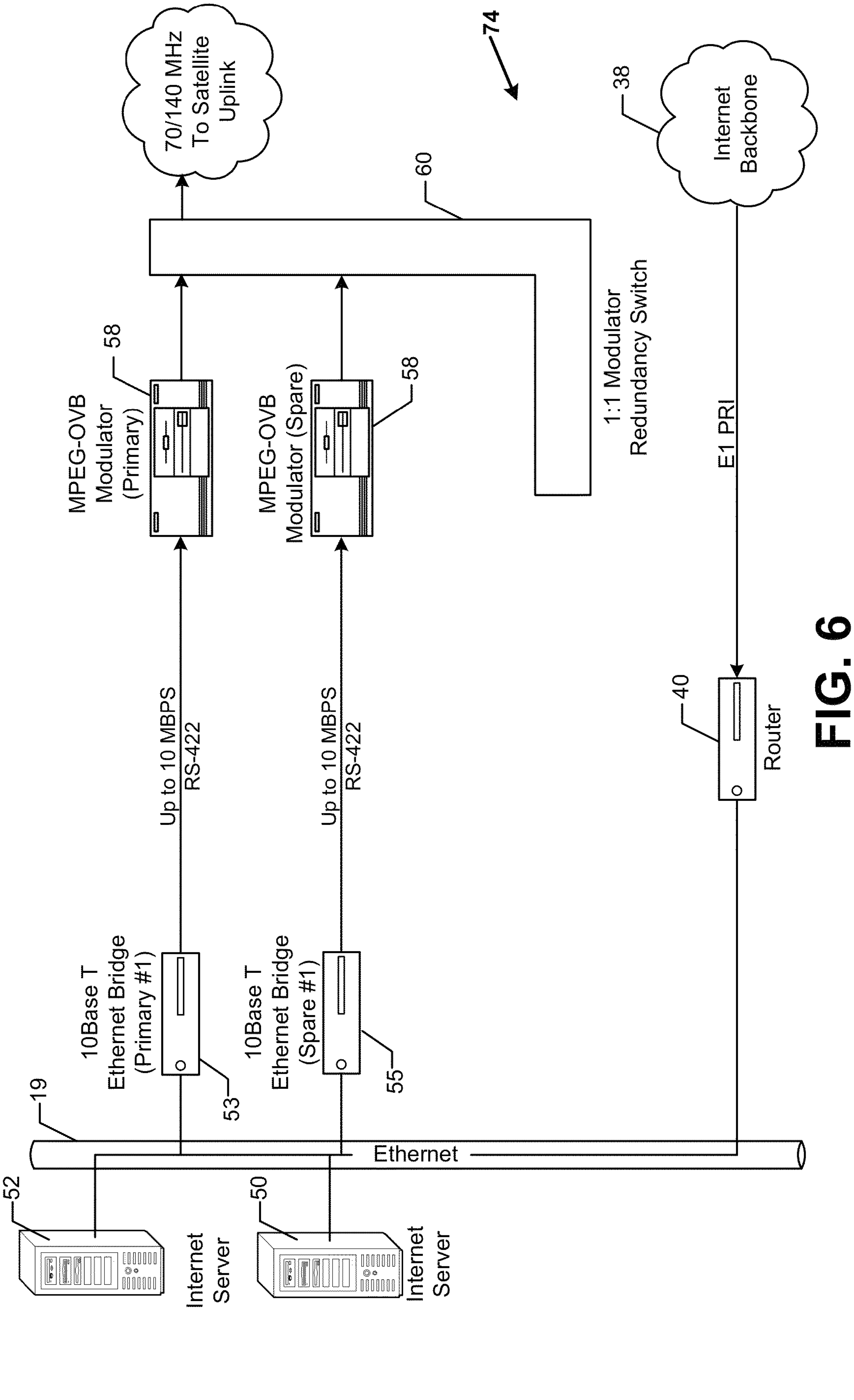
FIG. 6 is a block diagram of the applicants' preferred redundant uplink

With reference now to FIG. 6, the applicants' preferred clear channel system, generally 74, eliminates the need for both costly multiplexers (e.g., 24 in FIG. 4) and the VBNMS and associated PC (54 of FIG. 4). The clear channel system 74 is well suited to applications not requiring delivery of multiple services through the system 74. The clear channel system 74 of FIG. 6 provides up to 10 mbps of Ethernet TCP/IP data directly into the input of an MPEG DVB modulator, e.g., 58, for uplinking of the frequency modulated data for broadcast through the satellite (20 in FIG. 8A). (Note that, although these systems employ MPEG DVB modulators, they do not utilize DVB multiplexers or DVB encrypting schemes.)

Alternatively and with reference now to FIG. 7, the bridges 53, 55 may each instead consist of a 100BaseT Ethernet router 53, 55. As a result, these routers 53, 55 preferably may deliver up to 50 mbps HSSI output' directly into their respective modulators, e.g., 58. Applicants' preferred modulator for this application is a Radyne DM 45 available from Radyne Corporation.

The preferred receiver/router eliminates the need for any special or custom software while providing a powerful, reliable, and flexible system for high speed, asymmetrical distribution of Internet or TCP/IP compatible content, including bandwidth intensive audio, video, or multimedia content, to an Ethernet computer network. This is particularly useful where a digital terrestrial infrastructure is lacking, overburdened, otherwise inadequate, or cost prohibitive.

Although in the above detailed description, the applicants preferred embodiments include Internet or telecommunications backchannels, the above system may utilized to provide high speed audio or video multicasting (via UDP packets and deletion of the backchannel). In this utilization of the applicant's receiver/router in a one way system from the uplink to the receiver/router, all remote LAN's or other connected computers receive the same data broadcast without any interference to the broadcast such as would be encountered if it were to be sent through the Internet backbone.

Additionally, the EDS Card may be preferably utilized in conjunction with a Transportal 2000 Store-and-Forward System or the StarGuide III Receiver available from StarGuide Digital Networks, Inc., of Reno, Nev.

Additionally, as illustrated in the flowchart 1100 FIG. 11, the present invention may be employed to distribute data or content, for example, audio advertising, from a centralized origination location to a number of geographically diverse receivers. A particular example of such a data distribution system is the distribution of audio advertising, particularly localized audio spots comprising a national advertising campaign. First, at step 1110 content data is originated. For the audio spot example, the audio spots may be recorded at an centralized origination location such as a recording studio or an advertising agency. Next, at step 1120, the content data is localized. For the audio spot example, the audio spot is localized by, for example including the call letters of a local receiver or including a reference to the region. Next, at step 1130, the content data is transmitted to and received by a remote receiver. For the audio spot example, the audio spot may be transmitted for geographically diverse broadcast receivers via a satellite data transmission system. Once the content data has been received by the remote receiver, the content data may be stored locally at the receiver step 1140, the content data may be modified at the receiver at step 1150, the content data may be immediately broadcast at step 1160, or the content data may be further transmitted at step 1170, via a LAN for example. For the audio spot example, the audio spot may be stored at the receiver, the audio spot may be modified, for example by mixing or cross fading the audio spot with a local audio signal, the audio spot may be immediately broadcast, or the audio spot may be further transmitted via a network such as a LAN or downloaded from the receiver. Finally, at step 1180, a confirmation may optionally be sent to the data origination location. The confirmation may indicate that the content data has been received by the receiver. Additional confirmations may be sent to the data origination location when the content data is broadcast as in step 1160, or further transmitted as in step 1170, for example. For the audio spot example, a confirmation may be sent when the spot is received and additionally when the spot is broadcast or further transmitted, for example. The present invention thus provides a distribution system providing reliable, fast and efficient delivery of content as well as increased automation capability throughout the system. For the audio spot example, increased automation, ease of use and speed of distribution of a national ad campaign to a number of local broadcasters may allow increased broadcast advertising and may draw major advertising expenditures into national broadcasting advertising campaigns.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed:

1. A network card configured to be integrated in a satellite receiver, the network card comprising:

a storage component configured to store data received via the satellite receiver as files;

a router configured to select a path for at least one of said files;

a network transceiver configured to transmit at least one of said files;

a server configured to communicate with external devices; and a resolver configured to translate mnemonic network addresses into numerical network addresses, wherein the server and resolver are configured to allow operation of the network card to be configured and contents of the storage component to be accessed remotely via a web browser.

2. The network card of claim 1 further comprising a multicasting processor configured to provide multicasting of at least some of said data.

3. The network card of claim 1 further comprising a processor configured to dynamically configure a network address of said network card.

4. The network card of claim 1 further comprising a confirmation web client configured to send confirmations indicative of data being received by the network card to a remote location in response to a predetermined event.

5. The network card of claim 1 further comprising an audio subsystem configured to combine a received audio signal with locally inserted audio signals.

6. The network card of claim 1 further comprising a command processor configured to display at least a portion of data stored in said network card and prompt said network card to transmit at least one of the data.

7. The network card of claim 1, wherein said network card is configured to be connected to a backplane in the satellite receiver.

8. The network card of claim 1, wherein said network card is configured to store and forward media files.

9. The network card of claim 1, wherein said audio signals comprise media data packets and said network card is configured to route said media data packets.

10. The network card of claim 1, wherein said network card further includes:

a multicasting processor configured to provide multicasting of at least some of said files; and an audio subsystem configured to combine a received audio signal with a locally inserted audio signal; and a command processor configured to generate display data representative of at least a portion of said files and to prompt said network card to transmit at least a portion of said files.

11. The network card of claim 10, wherein said network card further includes:

a processor configured to dynamically configure a network address of said network card; and a confirmation web client configured to send confirmations to a remote location when predetermined events occur.

12. A network card for use in a satellite data stream reception system, the network card comprising:

a flash memory storage configured to store at least a portion of a data stream received via the satellite data stream reception system;

a network transceiver configured to transmit the portion of the received data stream;

a resolver configured to translate mnemonic network addresses into numerical network addresses and vice versa; and a server configured to allow operation of the network card to be configured and contents of the flash memory storage to be accessed remotely via a web browser.

13. The network card of claim 12 further comprising a processor configured to dynamically configure a network address of said network card.

14. The network card of claim 12 further comprising a confirmation web client configured to send confirmations indicative of data being received by the network card to a remote location in response to a predetermined event.

15. The network card of claim 12 further comprising an audio subsystem configured to combine a received audio data stream with locally inserted audio.

16. The network card of claim 12 further comprising a command processor configured to display the portion of the received data stream stored in said flash memory storage and prompt said network transceiver to transmit the portion of the received data stream.

17. The network card of claim 12 further comprising a multicasting processor configured to provide multicasting of the portion of the received data stream.

18. The network card of claim 12 further comprising a router configured to select a path for the portion of the received data stream.

19. The network card of claim 12, wherein said network card is configured to be connected to a backplane in the satellite data stream reception system.

20. A network card for use in a satellite data stream reception system, the network comprising:

a flash memory storage configured to store at least a portion of a data stream received via the satellite data stream reception system;

a network transceiver configured to transmit the portion of the received data stream;

a multicasting processor configured to provide multicasting of the portion of the received data stream;

a resolver configured to translate mnemonic network addresses into numerical network addresses and vice versa; and a server configured to allow operation of the network card to be configured and contents of the flash memory storage to be accessed remotely via a web browser.

21. The network card of claim 20 further comprising a processor configured to dynamically configure a network address of said network card.

22. The network card of claim 20 further comprising a confirmation web client configured to send confirmations indicative of data streams being received by the network card to a remote location in response to a predetermined event.

23. The network card of claim 20 further comprising an audio subsystem configured to combine a received audio data stream with locally inserted audio.

24. The network card of claim 20 further comprising a command processor configured to display the portion of the received data stream stored in said flash memory storage and prompt said network transceiver to transmit the portion of the received data stream.

25. The network card of claim 20, wherein said network card is configured to be connected to a backplane in the satellite data stream reception system.

26. A network card configured to be integrated in a satellite receiver, the network card comprising:

a storage component configured to store signals received via the satellite receiver as files, wherein the received signals comprises at least one audio signal;

a multicasting processor configured to provide multicasting of at least one of said received signals;

an audio subsystem configured to combine the audio signal with a local audio signal;

a command processor configured to display at least a portion of the received signals stored in said network card and to prompt said network card to transmit the portion of said received signals;

a router configured to select a path for at least one of said received signals; and a network transceiver configured to transmit at least one of said received signals.

27. The network card of claim 26 further comprising a server configured to communicate with an external device via a web browser.

28. The network card of claim 26 further comprising a resolver configured to translate mnemonic network addresses into numerical network addresses.

29. The network card of claim 26 further comprising a processor configured to dynamically configure a network address of said network card.

30. The network card of claim 26 further comprising a confirmation web client configured to send confirmations to a remote location in response to a predetermined event.

31. The network card of claim 26, wherein said network card is configured to be connected to a backplane.

32. The network card of claim 26, wherein said network card is configured to store and forward media files.

33. The network card of claim 26, wherein said signals comprise media data packets and said network card is configured to route said media data packets.

34. A method for network communication using a network card communicatively coupled to a satellite receiver, the method comprising:

storing data received via the satellite receiver as files;

communicating with external devices and selecting a path for transmitting at least one of said files;

translating mnemonic network addresses into numerical network addresses;

allowing operation of the network card to be configured remotely via a web browser; and allowing the stored data to be accessed remotely via the web browser.

35. The method of claim 34 further comprising sending confirmations indicative of data being received by the network card to a remote location in response to a predetermined event.

36. The method of claim 34, further comprising:

multicasting at least some of said files;

combining a received audio signal with a locally inserted audio signal; and generating display data representative of at least a portion of said files and causing said network card to transmit at least a portion of said files.

37. A method for network communication using a network card coupled to a satellite receiver, the method comprising:

storing signals received via the satellite receiver as files, wherein the received signals comprise at least one audio signal;

multicasting at least one of the received signals;

combining the audio signal with a local audio signal;

displaying at least a portion of the received signals stored in said network card and causing the network card to transmit the portion of the received signals;

selecting a path for at least one of the received signals; and transmitting at least one of the received signals.

38. The method of claim 37 further comprising translating mnemonic network addresses into numerical network addresses.

39. The method of claim 38 further comprising storing and forwarding media files.

40. The method of claim 37 wherein the signals comprise media data packets, further comprising routing the media data packets.

* * * * *